United States Patent
Okano et al.

(10) Patent No.: US 12,462,533 B2
(45) Date of Patent: Nov. 4, 2025

(54) CLASSIFICATION DEVICE, IMAGE CLASSIFICATION METHOD, AND PATTERN INSPECTION DEVICE

(71) Applicant: Semiconductor Energy Laboratory Co., Ltd., Kanagawa-ken (JP)

(72) Inventors: Tatsuya Okano, Kanagawa (JP); Ryo Nakazato, Kanagawa (JP)

(73) Assignee: Semiconductor Energy Laboratory Co., Ltd. (JP)

( * ) Notice: Subject to any disclaimer, the term of this patent is extended or adjusted under 35 U.S.C. 154(b) by 483 days.

(21) Appl. No.: 17/918,702

(22) PCT Filed: Apr. 9, 2021

(86) PCT No.: PCT/IB2021/052938
§ 371 (c)(1),
(2) Date: Oct. 13, 2022

(87) PCT Pub. No.: WO2021/209867
PCT Pub. Date: Oct. 21, 2021

(65) Prior Publication Data
US 2023/0351730 A1  Nov. 2, 2023

(30) Foreign Application Priority Data

Apr. 17, 2020  (JP) ................. 2020-073779

(51) Int. Cl.
*G06V 10/774*  (2022.01)
*G06T 7/00*  (2017.01)
(Continued)

(52) U.S. Cl.
CPC .......... *G06V 10/774* (2022.01); *G06T 7/0004* (2013.01); *G06V 10/762* (2022.01);
(Continued)

(58) Field of Classification Search
CPC .. G06V 10/774; G06V 10/762; G06V 10/764; G06V 10/7715; G06V 10/82;
(Continued)

(56) References Cited

U.S. PATENT DOCUMENTS

| | | | |
|---|---|---|---|
| 7,333,650 B2 | 2/2008 | Yamamoto et al. | |
| 9,589,374 B1 | 3/2017 | Gao et al. | |

(Continued)

FOREIGN PATENT DOCUMENTS

| | | | |
|---|---|---|---|
| CN | 106897573 A | 6/2017 | |
| CN | 110852983 A | 2/2020 | |

(Continued)

OTHER PUBLICATIONS

International Search Report (Application No. PCT/IB2021/052938) Dated Jul. 13, 2021.

(Continued)

*Primary Examiner* — Mia M Thomas
(74) *Attorney, Agent, or Firm* — Husch Blackwell LLP

(57) ABSTRACT

A novel classification device is provided. The classification device includes a memory unit, a processing unit, and a classifier. A plurality of pieces of image data and a discriminative model are stored in the memory unit. Each of the plurality of pieces of image data is image data determined to contain a defect. The discriminative model includes an input layer, an intermediate layer, and an output layer. First to n-th (n is an integer greater than or equal to 2) image data of the plurality of pieces of image data are supplied to the processing unit. The processing unit has a function of outputting feature values of the first to the n-th image data (a first to an n-th feature value) on the basis of the discriminative model. A feature value output from the processing unit is a numerical value of a neuron included in the intermediate layer. The first to the n-th feature value output from the processing unit (Continued)

are supplied to the classifier. The classifier has a function of performing clustering of the first to the n-th image data on the basis of the first to the n-th feature value.

15 Claims, 13 Drawing Sheets

(51) Int. Cl.
 *G06V 10/762* (2022.01)
 *G06V 10/764* (2022.01)
 *G06V 10/77* (2022.01)
 *G06V 10/82* (2022.01)
(52) U.S. Cl.
 CPC ........ *G06V 10/764* (2022.01); *G06V 10/7715* (2022.01); *G06V 10/82* (2022.01); *G06T 2207/20081* (2013.01); *G06T 2207/20084* (2013.01); *G06T 2207/30148* (2013.01)
(58) Field of Classification Search
 CPC .............. G06V 2201/06; G06T 7/0004; G06T 2207/20081; G06T 2207/20084; G06T 2207/30148; G01N 21/88
 See application file for complete search history.

(56) References Cited

U.S. PATENT DOCUMENTS

| | | | | |
|---|---|---|---|---|
| 10,095,977 | B1* | 10/2018 | Kim | G06N 3/04 |
| 10,234,848 | B2* | 3/2019 | Mehr | B22F 10/25 |
| 10,304,191 | B1* | 5/2019 | Mousavian | G06V 10/255 |
| 10,740,654 | B2* | 8/2020 | Habibian | G06N 3/045 |
| 10,962,939 | B1* | 3/2021 | Das | G06F 16/3344 |
| 10,997,500 | B1* | 5/2021 | Vishnu Narayanan | G06N 5/04 |
| 11,017,556 | B2* | 5/2021 | Yang | G06T 7/74 |
| 11,062,454 | B1* | 7/2021 | Cohen | G01S 7/417 |
| 11,132,788 | B2 | 9/2021 | Dou et al. | |
| 11,311,247 | B2* | 4/2022 | Kearney | A61B 6/5294 |
| 2005/0002560 | A1 | 1/2005 | Yamamoto et al. | |
| 2017/0147921 | A1* | 5/2017 | Kasahara | G06N 3/045 |
| 2017/0237961 | A1* | 8/2017 | Barron | H04N 1/6086 348/223.1 |
| 2017/0372155 | A1* | 12/2017 | Odry | G06F 18/28 |
| 2018/0137389 | A1* | 5/2018 | Mathieu | G06V 10/454 |
| 2018/0165548 | A1* | 6/2018 | Wang | G06F 18/214 |
| 2019/0026897 | A1* | 1/2019 | Wu | G06T 11/005 |
| 2019/0095730 | A1* | 3/2019 | Fu | G06V 10/764 |
| 2019/0228266 | A1* | 7/2019 | Habibian | G06N 3/044 |
| 2020/0034693 | A1 | 1/2020 | Huh et al. | |
| 2020/0065976 | A1* | 2/2020 | Han | G06V 10/82 |
| 2020/0074611 | A1 | 3/2020 | Dou et al. | |
| 2020/0118263 | A1* | 4/2020 | Nogami | G06T 7/73 |
| 2020/0134383 | A1* | 4/2020 | Rhee | G06N 3/088 |
| 2020/0226368 | A1* | 7/2020 | Bakalo | G06N 3/045 |
| 2021/0004954 | A1* | 1/2021 | Ijiri | G06N 3/04 |
| 2021/0027095 | A1 | 1/2021 | Kamada et al. | |
| 2021/0158031 | A1* | 5/2021 | Du | G06V 40/28 |
| 2021/0334664 | A1* | 10/2021 | Li | G06V 30/413 |
| 2021/0374950 | A1* | 12/2021 | Gao | G06T 7/70 |
| 2021/0383524 | A1 | 12/2021 | Dou et al. | |
| 2022/0382937 | A1* | 12/2022 | Inoue | G06F 30/27 |
| 2023/0039064 | A1* | 2/2023 | Okano | G06N 20/00 |
| 2023/0196119 | A1* | 6/2023 | Hu | B61L 27/70 706/25 |
| 2023/0351730 | A1* | 11/2023 | Okano | G01N 21/88 |
| 2024/0013317 | A1* | 1/2024 | Momo | G06N 3/09 |
| 2024/0135483 | A1* | 4/2024 | Wang | G06N 3/044 |

FOREIGN PATENT DOCUMENTS

| | | |
|---|---|---|
| EP | 3 491 625 A | 6/2019 |
| EP | 3 779 805 A1 | 2/2021 |
| JP | 08-021803 A | 1/1996 |
| JP | 2004-354251 A | 12/2004 |
| JP | 2018-005639 A | 1/2018 |
| JP | 2018-180628 A | 11/2018 |
| JP | 2019-530488 | 10/2019 |
| JP | 2020-035282 A | 3/2020 |
| KR | 2020-0012334 A | 2/2020 |
| KR | 2020-0026110 A | 3/2020 |
| TW | 202011017 | 3/2020 |
| WO | WO 2018/026431 A1 | 2/2018 |
| WO | WO 2019/189026 A1 | 10/2019 |

OTHER PUBLICATIONS

Written Opinion (Application No. PCT/IB2021/052938) Dated Jul. 13, 2021.

* cited by examiner

| Image data | Label |
|---|---|
| 51_1 | 61A |
| 51_2 | 61A |
| ⋮ | ⋮ |
| 51_s | 61F |
| 52_1 | — |
| 52_2 | — |
| ⋮ | ⋮ |
| 52_t | — |

FIG. 6

| Image data | Feature value |
|---|---|
| 53_1 | 62_1 (63_1[1] to 63_1[*u*]) |
| 53_2 | 62_2 (63_2[1] to 63_2[*u*]) |
| ⋮ | ⋮ |
| 53_*n* | 62_*n* (63_*n*[1] to 63_*n*[*u*]) |

CLASSIFICATION DEVICE, IMAGE CLASSIFICATION METHOD, AND PATTERN INSPECTION DEVICE

This application is a 371 of international application PCT/IB2021/052938 filed on Apr. 9, 2021 which is incorporated herein by reference.

TECHNICAL FIELD

One embodiment of the present invention relates to a classification device. Another embodiment of the present invention relates to an image classification method. Another embodiment of the present invention relates to a pattern inspection device.

BACKGROUND ART

Visual inspection is given as a means for detecting defects in a semiconductor manufacturing process. A pattern inspection device is an example of a device for automatically performing visual inspection (visual inspection device). The visual inspection device performs defect detection and identification on obtained image. When defect detection and identification are performed visually, the accuracy of defect detection and identification may vary among individuals. Furthermore, when the number of pieces of image data is large, defect detection and identification take an enormous amount of time.

In recent years, a technique of identifying defects (faults) by utilizing a neural network has been reported. For example, Patent Document 1 discloses a fault type determination device that identifies a fault by using a neuro processing unit to which information on faults is input and which is trained to output a result of fault identification.

REFERENCE

Patent Document

[Patent Document 1] Japanese Published Patent Application No. H8-21803

SUMMARY OF THE INVENTION

Problems to be Solved by the Invention

To train a neuro processing unit, information on faults needs to be associated with the type of fault in advance. In Patent Document 1, information on faults is the area of fault, the shape of fault, the position of fault, or the like and is obtained using an image processing device. However, when a plurality of faults overlap with each other or exist in the same region, the accuracy of information on the faults might be lowered.

When a defect is detected, it is necessary to determine whether or not a rework process is performed. Determination of whether or not a rework process is performed needs to be made by overviewing the occurrence frequency of each defect, defect distribution in a lot/substrate, or the like as well as the type of defect.

In view of the above, an object of one embodiment of the present invention is to provide a novel classification device. Another object of one embodiment of the present invention is to provide a novel image classification method. Another object of one embodiment of the present invention is to provide a novel pattern inspection device.

Note that the description of these objects does not preclude the existence of other objects. One embodiment of the present invention does not have to achieve all these objects. Other objects are apparent from the description of the specification, the drawings, the claims, and the like, and other objects can be derived from the description of the specification, the drawings, the claims, and the like.

Means For Solving the Problems

One embodiment of the present invention is a classification device that includes a memory unit, a processing unit, and a classifier. A plurality of pieces of image data and a discriminative model are stored in the memory unit. The discriminative model includes a plurality of convolutional layers, a plurality of pooling layers, a first fully connected layer, a second fully connected layer, a third fully connected layer, a fourth fully connected layer, and a fifth fully connected layer. The fifth fully connected layer is an output layer. The fourth fully connected layer is connected to the fifth fully connected layer. The third fully connected layer is connected to the fourth fully connected layer. The second fully connected layer is connected to the third fully connected layer. The first fully connected layer is connected to the second fully connected layer. First to n-th (n is an integer greater than or equal to 2) image data of the plurality of pieces of image data are supplied to the processing unit. The processing unit has a function of outputting a k-th (k is an integer greater than or equal to 1 and less than or equal to n) feature value of k-th image data on the basis of the discriminative model. A feature value output from the processing unit is a numerical value of a neuron included in the first fully connected layer, a numerical value of a neuron included in the second fully connected layer, or a numerical value of a neuron included in the third fully connected layer. A first to an n-th feature value output from the processing unit are supplied to the classifier. The classifier has a function of performing clustering of the first to the n-th image data on the basis of the first to the n-th feature value.

Another embodiment of the present invention is a classification device that includes a memory unit, a processing unit, and a classifier. A plurality of pieces of image data and a discriminative model are stored in the memory unit. The discriminative model includes a plurality of convolutional layers, a plurality of pooling layers, a first fully connected layer, a second fully connected layer, and a third fully connected layer. The third fully connected layer is an output layer. The second fully connected layer is connected to the third fully connected layer. The first fully connected layer is connected to the second fully connected layer. First to n-th (n is an integer greater than or equal to 2) image data of the plurality of pieces of image data are supplied to the processing unit. The processing unit has a function of outputting a k-th (k is an integer greater than or equal to 1 and less than or equal to n) feature value of k-th image data on the basis of the discriminative model. A feature value output from the processing unit is a numerical value of a neuron included in the first fully connected layer or a numerical value of a neuron included in the second fully connected layer. A first to an n-th feature value output from the processing unit are supplied to the classifier. The classifier has a function of performing clustering of the first to the n-th image data on the basis of the first to the n-th feature value.

Another embodiment of the present invention is a classification device that includes a memory unit, a processing unit, and a classifier. A plurality of pieces of image data and a discriminative model are stored in the memory unit. The discriminative model includes a plurality of convolutional layers, a plurality of pooling layers, and a fully connected layer. The fully connected layer is an output layer. First to n-th (n is an integer greater than or equal to 2) image data of the plurality of pieces of image data are supplied to the processing unit. The processing unit has a function of outputting a k-th (k is an integer greater than or equal to 1 and less than or equal to n) feature value of k-th image data on the basis of the discriminative model. A feature value output from the processing unit is a numerical value of a neuron included in any one of the plurality of convolutional layers or a numerical value of a neuron included in any one of the plurality of pooling layers. A first to an n-th feature value output from the processing unit are supplied to the classifier. The classifier has a function of performing clustering of the first to the n-th image data on the basis of the first to the n-th feature value.

In the classification device, each of the plurality of pieces of image data is preferably image data determined to contain a defect.

Another embodiment of the present invention is a classification device that includes a memory unit, a processing unit, and a classifier. A plurality of pieces of image data and a discriminative model are stored in the memory unit. Each of the plurality of pieces of image data is image data determined to contain a defect. The discriminative model includes an input layer, an intermediate layer, and an output layer. First to n-th (n is an integer greater than or equal to 2) image data of the plurality of pieces of image data are supplied to the processing unit. The processing unit has a function of outputting a k-th (k is an integer greater than or equal to 1 and less than or equal to n) feature value of k-th image data on the basis of the discriminative model. A feature value output from the processing unit is a numerical value of a neuron included in the intermediate layer. A first to an n-th feature value output from the processing unit are supplied to the classifier. The classifier has a function of performing clustering of the first to the n-th image data on the basis of the first to the n-th feature value.

Another embodiment of the present invention is a classification device that includes a memory unit, a treatment unit, a processing unit, and a classifier. A plurality of pieces of image data and a discriminative model are stored in the memory unit. Each of the plurality of pieces of image data is image data determined to contain a defect. The discriminative model includes an input layer, an intermediate layer, and an output layer. First to n-th (n is an integer greater than or equal to 2) image data of the plurality of pieces of image data are supplied to the treatment unit. The treatment unit has a function of generating (n+k)-th (k is an integer greater than or equal to 1 and less than or equal to n) image data by eliminating part of k-th image data. To the processing unit, (n+1)-th to (2n)-th image data are supplied. The processing unit has a function of outputting a k-th feature value of the (n+k)-th image data on the basis of the discriminative model. A feature value output from the processing unit is a numerical value of a neuron included in the intermediate layer. A first to an n-th feature value output from the processing unit are supplied to the classifier. The classifier has a function of performing clustering of the first to the n-th image data on the basis of the first to the n-th feature value.

In the classification device, the number of dimensions of the feature value output from the processing unit is preferably greater than or equal to 32 and less than or equal to 256.

In the classification device, the discriminative model is preferably subjected to supervised learning so that the type of defect of image data determined to contain a defect is inferred, and a hierarchical method is preferably used for the clustering.

The classification device preferably includes an output unit in addition to the memory unit, the processing unit, and the classifier. The output unit preferably has a function of displaying a result of the clustering performed by the classifier.

Another embodiment of the present invention is a pattern inspection device that includes the classification device, an imaging unit, and an inspection device. The imaging unit has a function of capturing an image of an object to be inspected. The inspection device has a function of determining whether or not a defect is contained in image data obtained through the capturing by the imaging unit.

Another embodiment of the present invention is an image classification method that includes a first step of supplying first to n-th (n is an integer greater than or equal to 2) image data to a processing unit, a second step of extracting a first to an n-th feature value of the first to the n-th image data using the processing unit on the basis of a discriminative model, a third step of supplying the first to the n-th feature value to a classifier, and a fourth step of performing clustering of the first to the n-th image data using the classifier on the basis of the first to the n-th feature value. Each of the first to the n-th image data is image data determined to contain a defect; the discriminative model includes an input layer, an intermediate layer, and an output layer; and a feature value output from the processing unit is a numerical value of a neuron included in the intermediate layer.

In the image classification method, the discriminative model is preferably subjected to supervised learning so that the type of defect of image data determined to contain a defect is inferred, and a hierarchical method is preferably used for the clustering.

In the image classification method, the number of dimensions of the feature value output from the processing unit is preferably greater than or equal to 32 and less than or equal to 256.

In the image classification method, a result of the clustering performed by the classifier is preferably supplied to an output unit in a fifth step, and the result is preferably displayed in a sixth step.

Effect of the Invention

According to one embodiment of the present invention, a novel classification device can be provided. According to another embodiment of the present invention, a novel image classification method can be provided. According to another embodiment of the present invention, a novel pattern inspection device can be provided.

Note that the effects of embodiments of the present invention are not limited to the effects listed above. The effects listed above do not preclude the existence of other effects. Note that the other effects are effects that are not described in this section and will be described below. The effects that are not described in this section can be derived from the descriptions of the specification, the drawings, and the like and can be extracted from these descriptions by those skilled in the art. Note that one embodiment of the present invention has at least one of the effects listed above and/or the other effects. Accordingly, depending on the case, one embodiment of the present invention does not have the effects listed above in some cases.

BRIEF DESCRIPTION OF THE DRAWINGS

FIG. 2 is a diagram showing examples of image data and labels.

FIG. 6 is a diagram showing examples of image data and feature values.

MODE FOR CARRYING OUT THE INVENTION

Figure 1:
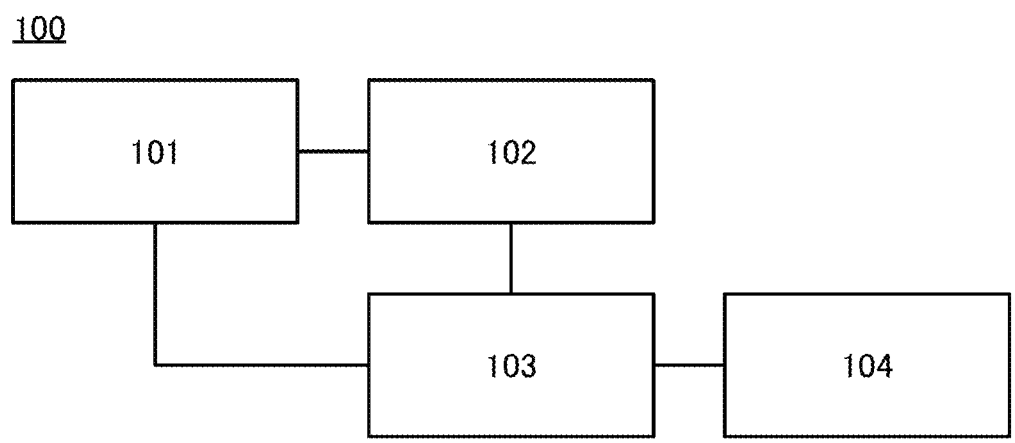
FIG. 1 is a block diagram showing an example of a classification device.

Embodiments will be described in detail with reference to the drawings. Note that the present invention is not limited to the following description, and it will be readily understood by those skilled in the art that modes and details of the present invention can be modified in various ways without departing from the spirit and scope of the present invention. Thus, the present invention should not be construed as being limited to the description of embodiments below.

Note that in structures of the invention described below, the same portions or portions having similar functions are denoted by the same reference numerals in different drawings, and the description thereof is not repeated.

The position, size, range, or the like of each component illustrated in drawings does not represent the actual position, size, range, or the like in some cases for easy understanding. Therefore, the disclosed invention is not necessarily limited to the position, size, range, or the like disclosed in the drawings.

Furthermore, ordinal numbers such as "first," "second," and "third" used in this specification are used in order to avoid confusion among components, and the terms do not limit the components numerically.

In this specification, in the case where the maximum value and the minimum value are specified, a structure in which the maximum value and the minimum value are freely combined is disclosed.

In this specification, a data set used for learning and evaluation of a machine learning model is referred to as a learning data set. In learning and evaluation of a machine learning model, the learning data set is divided into learning data (also referred to as training data) and test data (also referred to as evaluation data). In some cases, the learning data is further divided into learning data and verification data. Note that the test data may be divided from the learning data set in advance.

The learning data is data used for learning of a machine learning model. The verification data is data used for evaluation of learning results of the machine learning model. The test data is data used for evaluation of the machine learning model. In the case where machine learning is supervised learning, a label is assigned to each of the learning data, the verification data, and the test data.

A semiconductor element in this specification and the like refers to an element that can function by utilizing semiconductor characteristics. Examples of the semiconductor element are semiconductor elements such as a transistor, a diode, a light-emitting element, and a light-receiving element. Other examples of the semiconductor element are passive elements such as a capacitor, a resistor, and an inductor, which are formed using a conductive film, an insulating film, or the like. Still another example of the semiconductor element is a semiconductor device provided with a circuit including a semiconductor element or a passive element.

Embodiment 1

In this embodiment, a classification device of one embodiment of the present invention will be described with reference to FIG. 1 to FIG. 4.

The classification device can be provided in an information processing device such as a personal computer used by a user. Alternatively, the classification device can be provided in a server to be accessed by a client PC via a network.

The classification device has a function of performing clustering of image data. In the description of this embodiment, the classification device performs clustering of defects detected in a semiconductor manufacturing process. In other words, the image data is image data containing defects detected in a semiconductor manufacturing process.

Examples of defects detected in a semiconductor manufacturing process include contamination with foreign matter, film loss, a defective pattern, a film residue, film floating, and disconnection. Contamination with foreign matter refers to a defect caused when foreign matter originating from workers, materials, manufacturing apparatuses, work environment, or the like is attached onto a substrate (e.g., a semiconductor substrate such as a silicon wafer, a glass substrate, a plastic substrate, a metal substrate, or an SOI substrate) in a semiconductor manufacturing process. Film loss refers to a defect caused when a normal pattern peels off. A defective pattern refers to a defect caused when a pattern is not formed as designed.

The image data is image data that is obtained by capturing a region where a pattern of a semiconductor film, an insulating film, a wiring, or the like (hereinafter, simply referred to as a pattern) in a semiconductor element in the middle of the manufacturing process or a semiconductor element whose manufacturing process has been completed is not normal. In other words, the image data can be referred to as image data obtained by capturing a region where a defect is observed. The image data is simply referred to as image data containing a defect in some cases.

<Classification Device 100>

FIG. 1 shows an example of a classification device of one embodiment of the present invention. FIG. 1 is a diagram showing a structure of a classification device 100. As shown in FIG. 1, the classification device 100 includes a memory unit 101, a processing unit 102, a classifier 103, and an output unit 104.

[Memory Unit 101]

Image data is stored in the memory unit 101. The image data is image data containing a defect.

Here, image data stored in the memory unit 101 is described with reference to FIG. 2. A plurality of pieces of image data 50 are stored in the memory unit 101. As shown in FIG. 2, the plurality of pieces of image data 50 include image data 51_1 to image data 51-$s$ ($s$ is an integer greater than or equal to 1) and image data 52_1 to image data 52_$t$ ($t$ is an integer greater than or equal to 1).

A label is assigned to each of the image data 51_1 to the image data 51-$s$. In FIG. 2, a label 61A is assigned to the image data 51_1 and the image data 51_2. A label 61F is assigned to the image data 51-$s$. In this embodiment, the labels assigned to the image data 51_1 to the image data 51-$s$ correspond to defects detected in a semiconductor manufacturing process. In other words, each of the label 61A, the label 61F, and the like corresponds to any one or more of defects detected in a semiconductor manufacturing process. Note that the type of defect detected in a semiconductor manufacturing process is given as a numerical array.

A label corresponding to a defect is not assigned to the image data 52_1 to the image data 52_$t$. Note that "-" in FIG. 2 indicates that a label is not assigned to image data.

[Processing Unit 102]

The processing unit 102 has a function of performing processing using a trained discriminative model. Specifically, the processing unit 102 has a function of extracting a feature value from image data using a trained discriminative model. To the processing unit 102, image data 53_1 to image data 53_$n$ ($n$ is an integer greater than or equal to 2) are supplied from the memory unit 101. Here, the image data 53_1 to the image data 53_$n$ are part or all of the plurality of pieces of image data 50 stored in the memory unit 101. In this case, a feature value of each of the image data 53_1 to the image data 53_$n$ is extracted in the processing unit 102.

As the discriminative model, a neural network is preferably used, and a convolutional neural network (CNN) is further preferably used. Examples of a CNN include VGG11, VGG16, GoogLeNet, and ResNet.

Figure 3A:
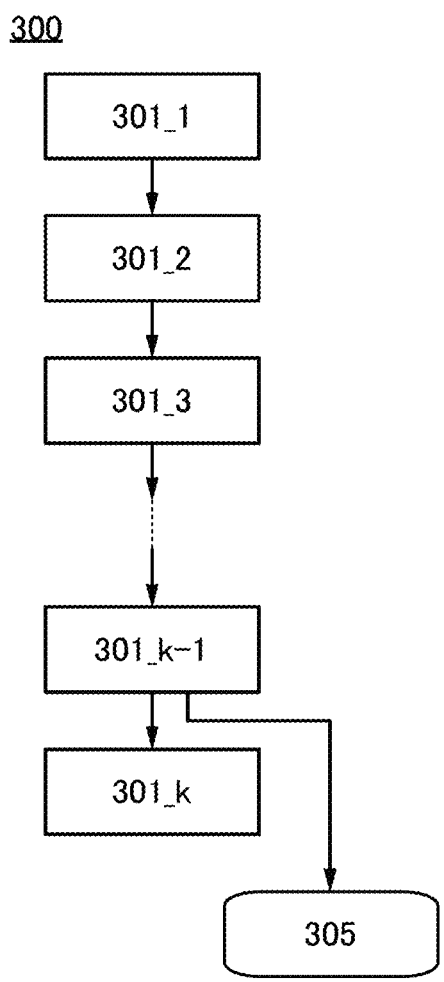
FIG. 3A and FIG. 3B are schematic diagrams showing structure examples of neural networks.

FIG. 3A is a diagram showing a structure example of a neural network 300. The neural network 300 includes a layer 301_1 to a layer 301_$k$ ($k$ is an integer greater than or equal to 3).

The layer 301_1 to the layer 301_$k$ include neurons, and the neurons provided in the layers are connected to one another. For example, the neuron provided in the layer 301_1 is connected to the neuron provided in the layer 301_2. The neuron provided in the layer 301_2 is connected to the neuron provided in the layer 301_1 and the neuron provided in the layer 301_3. Note that the same applies to the neuron provided in each of the layer 301_3 to the layer 301_$k$. In other words, the layer 301_1 to the layer 301_$k$ form a hierarchical neural network.

Image data is input to the layer 301_1, and the layer 301_1 outputs data corresponding to the input image data. The data is input to the layer 301_2, and the layer 301_2 outputs data corresponding to the input data. Data output from the layer 301_$k$-1 is input to the layer 301_$k$, and the layer 301_$k$ outputs data corresponding to the input data. In this manner, the layer 301_1 can be an input layer, the layer 301_2 to the layer 301_$k$-1 can be intermediate layers, and the layer 301_$k$ can be an output layer. Note that a neural network including two or more intermediate layers is also referred to as deep learning.

The neural network 300 learns in advance such that, for example, data output from the layer 301_1 to the layer 301_$k$ correspond to features of image data input to the neural network 300. Learning can be performed by unsupervised learning, supervised learning, or the like. When learning is performed by either unsupervised learning or supervised learning, a backpropagation method or the like can be used as a learning algorithm. In this embodiment, learning is preferably performed by supervised learning.

Figure 3B:
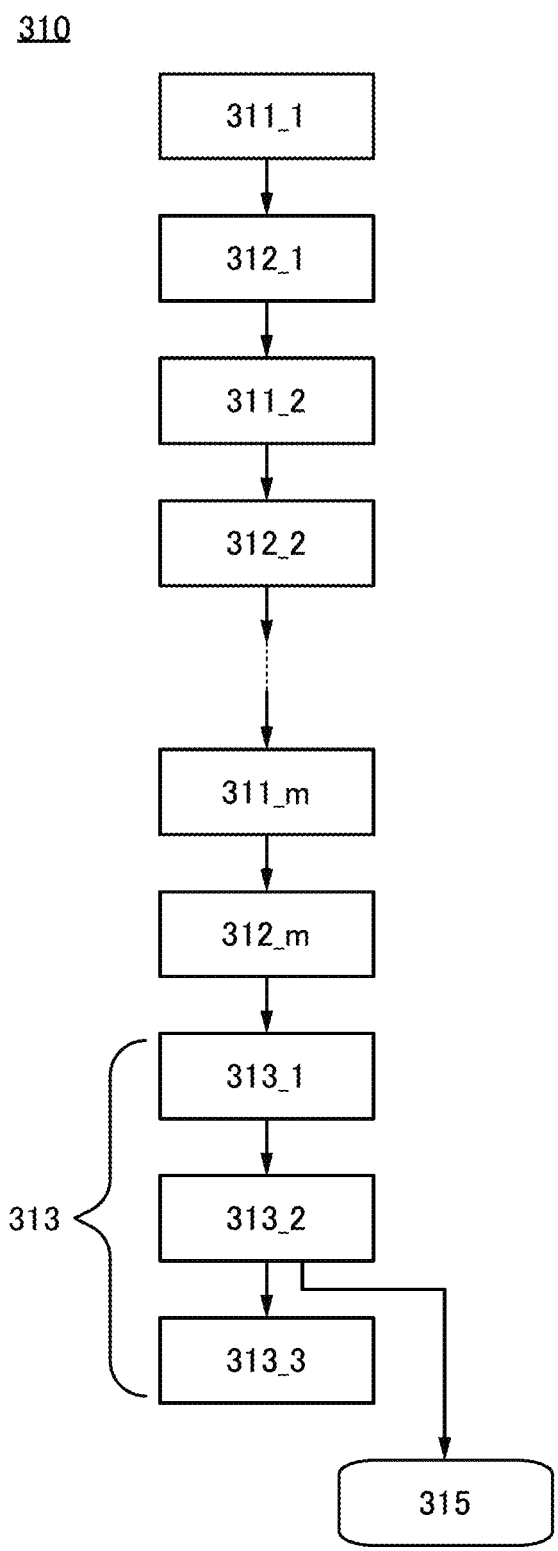

An example of a CNN is shown in FIG. 3B. FIG. 3B is a diagram showing a structure of a CNN 310. As shown in FIG. 3B, the CNN 310 includes a plurality of convolutional layers (a convolutional layer 311_1 to a convolutional layer 311_$m$ ($m$ is an integer greater than or equal to 1)), a plurality of pooling layers (a pooling layer 312_1 to a pooling layer 312_$m$), and a fully connected layer 313. FIG. 3B shows an example in which the fully connected layer 313 includes three layers of a fully connected layer 313_1, a fully connected layer 313_2, and a fully connected layer 313_3. Note that the CNN 310 may include only one or two layers as the fully connected layer 313 or may include four or more layers.

The convolutional layer has a function of performing convolution on data input to the convolutional layer. For example, the convolutional layer 311_1 has a function of performing convolution on input image data. The convolutional layer 311_2 has a function of performing convolution on data output from the pooling layer 312_1. The convolutional layer 311_$m$ has a function of performing convolution on data output from the pooling layer 312_$m$-1.

Convolution is performed by repetition of product-sum operation of data input to the convolutional layer and a weight filter. By the convolution in the convolutional layer, features or the like of an image corresponding to image data input to the CNN 310 are extracted.

The data subjected to the convolution is converted using an activation function and then is output to the pooling layer. As the activation function, ReLU (Rectified Linear Units) or the like can be used. ReLU is a function that outputs "0" when an input value is negative and outputs the input value as it is when the input value is greater than or equal to "0." As the activation function, a sigmoid function, a tanh function, or the like can be used as well.

The pooling layer has a function of performing pooling on the data input from the convolutional layer. Pooling is processing in which the data is partitioned into a plurality of regions, and predetermined data is extracted from each of the regions and arranged in a matrix. By the pooling, the size of the data can be reduced while the features extracted by the convolutional layer remain. Robustness for a minute difference of the input data can be increased. Note that as the pooling, max pooling, average pooling, Lp pooling, or the like can be used.

The fully connected layer 313 has a function of converting input data using an activation function and outputting the converted data. Specifically, in the case where the CNN 310 has the structure shown in FIG. 3B, the fully connected layer 313_1 has a function of converting data output from the pooling layer 312_$m$ using an activation function. The fully connected layer 313_2 has a function of converting data output from the fully connected layer 313_1 using an activation function. The fully connected layer 313_3 has a function of converting data output from the fully connected layer 313_2 using an activation function. As the activation function, ReLU, a sigmoid function, a tanh function, or the like can be used. The fully connected layer 313 has a structure in which all the nodes in one layer are connected to all the nodes in the next layer. The data output from the convolutional layer or the pooling layer is a two-dimensional feature map and is unfolded into a one-dimensional feature map when input to the fully connected layer 313.

Then, a vector obtained as a result of the inference by the fully connected layer 313 is output from the fully connected layer 313.

In the CNN 310, one layer included in the fully connected layer 313 can be an output layer. For example, in the CNN 310 shown in FIG. 3B, the fully connected layer 313_3 can be an output layer. Here, in the CNN 310 shown in FIG. 3B, the fully connected layer 313_1 and the fully connected layer 313_2 can be intermediate layers. Alternatively, in the case where the CNN 310 includes only the fully connected layer 313_1 as the fully connected layer 313, the fully connected layer 313_1 can be an output layer. Further alternatively, in the case where the CNN 310 includes the fully connected layer 313_1 and the fully connected layer 313_2, the fully connected layer 313_2 can be an output layer and the fully connected layer 313_1 can be an intermediate layer. Similarly, in the case where the CNN 310 includes four or more layers as the fully connected layer 313, one layer of the fully connected layer 313 can be an output layer and the other layers of the fully connected layer 313 can be intermediate layers.

Note that the structure of the CNN 310 is not limited to the structure shown in FIG. 3B. For example, each of the plurality of convolutional layers (the convolutional layer 311_1 to the convolutional layer 311_m) may include two or more convolutional layers. In other words, the number of convolutional layers included in the CNN 310 may be larger than that of pooling layers. In the case where the positional information of the extracted feature is desired to be left as much as possible, the pooling layer may be omitted.

Learning of the CNN 310 enables optimization of the filter value of the weight filter, the weight coefficient of the fully connected layer, or the like.

Image data is input to the discriminative model, and the discriminative model is trained to output a defect identification result. In other words, when image data is input to an input layer of a neural network, a defect identification result is output from the output layer of the neural network. For example, in the case where the neural network has the structure shown in FIG. 3A, when image data containing a defect is input to the layer 301_1 that is the input layer, a defect identification result is output from the layer 301_k that is the output layer. In the case where the neural network has the structure shown in FIG. 3B, when image data containing a defect is input to the convolutional layer 311_1 that is the input layer, a defect identification result is output from the fully connected layer 313_3 that is the output layer.

The processing unit 102 has a function of outputting a numerical value of a neuron included in an intermediate layer of a discriminative model. The numerical value of the neuron included in the intermediate layer includes data corresponding to a feature of image data input to the discriminative model (also referred to as a feature value). In other words, the numerical value of the neuron included in the intermediate layer is output, whereby a feature value of the image data input to the discriminative model can be extracted.

The number of dimensions of an extracted feature value is preferably a certain number or more. A small number of dimensions might result in insufficient accuracy of clustering. By contrast, a large number of dimensions causes a large amount of calculation in clustering, resulting in longer time required for clustering or lack of computer resources in some cases. The number of dimensions is preferably larger than the number of dimensions of the fully connected layer serving as an output layer, for example. Specifically, the number of dimensions is preferably greater than or equal to 32 and less than or equal to 1024, further preferably greater than or equal to 32 and less than or equal to 256.

In the case where the neural network has the structure shown in FIG. 3A, for example, a numerical value of a neuron included in the layer 301_k-1 is output. Here, the numerical value of the neuron output from the layer 301_k-1 is referred to as a feature value 305. The feature value 305 includes data corresponding to a feature of image data. Note that although the feature value 305 is output from the layer 301_k-1 in FIG. 3A, one embodiment of the present invention is not limited thereto. For example, the feature value 305 may be output from any one of the layer 301_2 to a layer 301_k-2.

In the case where the neural network has the structure shown in FIG. 3B, for example, a numerical value of a neuron included in the fully connected layer 313_2 is output. Here, the numerical value of the neuron output from the fully connected layer 313_2 is referred to as a feature value 315. The feature value 315 includes data corresponding to a feature of image data. Note that although the feature value 315 is output from the fully connected layer 313_2 in FIG. 3B, one embodiment of the present invention is not limited thereto. For example, the feature value 315 may be output from any one of the convolutional layer 311_1 to the convolutional layer 311_m, the pooling layer 312_1 to the pooling layer 312_m, and the fully connected layer 313_1. Note that the feature value output from the convolutional layer or the pooling layer is referred to as a feature map in some cases.

The processing unit 102 can perform processing using a CPU (Central Processing Unit), a GPU (Graphics Processing Unit), and the like. The processing unit 102, which is formed using a neural network, preferably employs a GPU in particular, in which case the processing can be performed at high speed.

The trained discriminative model may be stored in a memory unit (not shown in FIG. 1) included in the processing unit 102 or may be stored in the memory unit 101. In the case where the trained discriminative model is stored in the memory unit 101, the trained discriminative model is supplied from the memory unit 101 to the processing unit 102. Alternatively, the trained discriminative model may be supplied to the processing unit 102 via an input unit, a storage medium, communication, or the like.

[Classifier 103]

The classifier 103 has a function of performing clustering (cluster analysis). Specifically, the classifier 103 has a function of performing clustering of image data on the basis of feature values. A feature value of each of the image data 53_1 to the image data 53_n, which is extracted in the processing unit 102, is supplied to the classifier 103. In this case, in the classifier 103, clustering of the image data 53_1 to the image data 53_n is performed on the basis of the feature values of the image data 53_1 to the image data 53_n.

A hierarchical method or a non-hierarchical method can be used as a method of clustering (clustering analysis). The hierarchical method is a method for forming a cluster by combining similar data. Examples of the hierarchical method include the single linkage method, the complete linkage method, the group average method, and Ward's method. The non-hierarchical method is a method for dividing the entire data such that similar data belongs to the same cluster. An example of the non-hierarchical method is the k-means method.

In this embodiment, the hierarchical method is preferably used as a method of clustering (clustering analysis). In the case where image data containing a defect that has not previously been identified is included, the use of the hierarchical method can prevent the image data from being classified into a set classified as an identified detect. In the case where the data distribution of image data to be processed is unknown, the hierarchical method is suitable because there is no initial setting of the number of clusters. In the hierarchical method, the number of clusters is determined by setting a threshold value. The threshold value is preferably determined to be a high-precision value by using prepared sample data, for example.

In the case where the total number of pieces of image data is large, the k-means method is preferable as a method of clustering in some cases. When the total number of pieces of image data is large (e.g., above 2000), the k-means method is capable of performing clustering with fewer calculations than the hierarchical method in some cases. In the case of using the k-means method, the number of clusters may be automatically estimated by the x-means method or may be determined in advance by preparing sample data.

The classifier 103 may include a memory unit (not shown in FIG. 1). In that case, a program on a method of clustering is stored in the memory unit. Alternatively, the program on a method of clustering may be stored in the memory unit 101. In the case where the program is stored in the memory unit 101, the program is supplied from the memory unit 101 to the classifier 103. Alternatively, the program on a method of clustering may be supplied to the classifier 103 via an input unit, storage medium, communication, or the like.

[Output unit 104]

The output unit 104 has a function of supplying a result of clustering performed by the classifier 103. The output unit 104 may have a function of displaying the result. Examples of the output unit 104 include output devices such as a display and a speaker.

The classification device 100 may include an input unit (not shown in FIG. 1). Image data is preferably stored in the memory unit 101 via the input unit. In addition, a discriminative model, a program on a method of clustering, or the like may be stored in the memory unit 101 via the input unit. Note that image data may be stored in the memory unit 101 via a storage medium, communication, or the like.

The above is the description of the classification device 100. Note that although the classification device 100 in FIG. 1 includes the memory unit 101, the processing unit 102, the classifier 103, and the output unit 104, one embodiment of the present invention is not limited thereto. Variations of the classification device 100 will be given below. The variations of the classification device described below can be combined as appropriate with another classification device described in this specification and the like.

<Classification Device 100A>

Figure 4A:
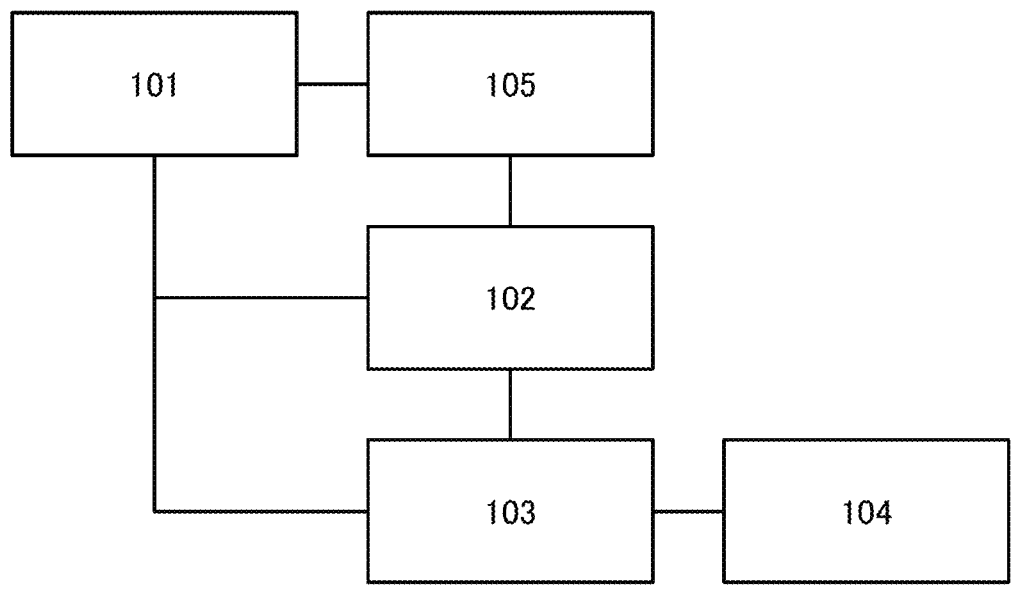
FIGS. 4A and 4B are block diagrams showing examples of classification devices.

FIG. 4A shows a classification device 100A that is a variation of the classification device 100 shown in FIG. 1. As shown in FIG. 4A, the classification device 100A includes a treatment unit 105 in addition to the memory unit 101, the processing unit 102, the classifier 103, and the output unit 104.

The treatment unit 105 has a function of processing image data. Note that the treatment of the image data will be described in detail later. The treatment unit 105 may have a function of performing data augmentation.

In the classification device 100A, the image data 53_1 to the image data 53_n are supplied to the treatment unit 105. The image data 53_1 to the image data 53_n are processed by the treatment unit 105, whereby image data 53a_1 to image data 53a_n that are different from the image data 53_1 to the image data 53_n are generated. The image data 53a_1 to the image data 53a_n generated by the treatment unit 105 are supplied to the processing unit 102. A feature value of each of the image data 53a_1 to the image data 53a_n is extracted by the processing unit 102. The plurality of feature values extracted by the processing unit 102 are supplied to the classifier 103. The image data 53_1 to the image data 53_n are clustered by the classifier 103 on the basis of the plurality of feature values.

The treatment unit 105 enables more features of defects contained in the image data to be included in the feature value extracted by the processing unit. Consequently, the accuracy of clustering can be improved.

The above is the description of the classification device 100A.

<Classification Device 100B>

Figure 4B:
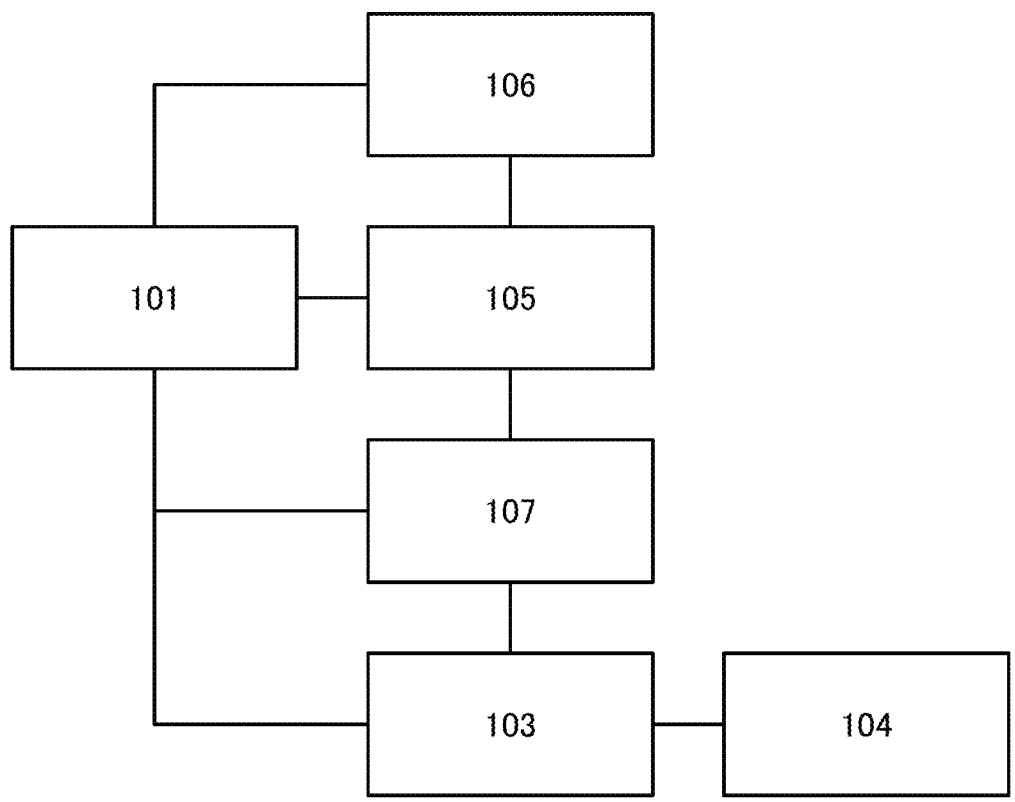

FIG. 4B shows a classification device 100B that is a variation of the classification device 100A shown in FIG. 4A. As shown in FIG. 4B, the classification device 100B includes the memory unit 101, the classifier 103, the output unit 104, the treatment unit 105, a first processing unit 106, and a second processing unit 107.

The second processing unit 107 corresponds to the processing unit 102 of the classification device 100A. Therefore, the description of the processing unit 102 can be referred to for the second processing unit 107.

The first processing unit 106 has a function of training a discriminative model. With the use of the first processing unit 106, a trained discriminative model can be generated. Alternatively, with the use of the first processing unit 106, a discriminative model can be retrained. A discriminative model is preferably retrained, for example, after labeled image data is stored in the memory unit 101 or after a label is assigned to one or a plurality of pieces of unlabeled image data stored in the memory unit 101 (the image data 52_1 to the image data 52_t shown in FIG. 2). Retraining a discriminative model enables a discriminative model with improved identification accuracy to be used and the accuracy of clustering to be improved.

The above is the description of the classification device 100B.

A clustering result obtained using the classification device of one embodiment of the present invention is used, whereby the time required for determination of the type of defect can be shortened even when defect identification is performed visually on image data with insufficient accuracy of inference performed by a discriminative model. Even a user who is not sufficiently proficient in defect identification can perform defect identification with high accuracy while shortening the time required for the defect identification.

Clustering of image data containing defects is performed by the classification device of one embodiment of the present invention, whereby a user can determine quickly and appropriately whether or not a rework process is performed. It is effective particularly in the case where image data containing a defect is associated with the position where the image data has been taken (the position in a lot/substrate). Furthermore, a defect that has not been identified or a defect whose type cannot be identified can be easily found out.

As described above, the use of the classification device of one embodiment of the present invention can improve work efficiency.

Note that image data clustered by the classification device of one embodiment of the present invention is not limited to image data containing a defect detected in a semiconductor manufacturing process. For example, the image data may be image data containing deterioration of or damage to buildings. Deterioration of buildings mean cracks, peeling, adhesion of foreign matter, corrosion, or the like. By performing clustering of image data containing deterioration of or damage to buildings, the buildings can be repaired quickly and appropriately. Note that the image data is preferably obtained by capturing an image of a building with a fixed point camera, a monitoring camera, or the like.

This embodiment can be combined with any of the other embodiments, Example, and the like as appropriate. In the case where a plurality of structure examples are described in one embodiment in this specification, the structure examples can be combined as appropriate.

Embodiment 2

In this embodiment, a method for classifying image data (image classification method) and a method for generating a trained discriminative model will be described with reference to FIG. 5 to FIG. 8. Note that the method for classifying image data of this embodiment can be performed using the classification device described in Embodiment 1.

<Method For Classifying Image Data>

A method for classifying image data of one embodiment of the present invention is described. Note that classification of image data described in this embodiment refers to division of a set of image data into a plurality of subsets. In other words, classification of image data in this embodiment can be referred to as clustering of image data.

Figure 5:
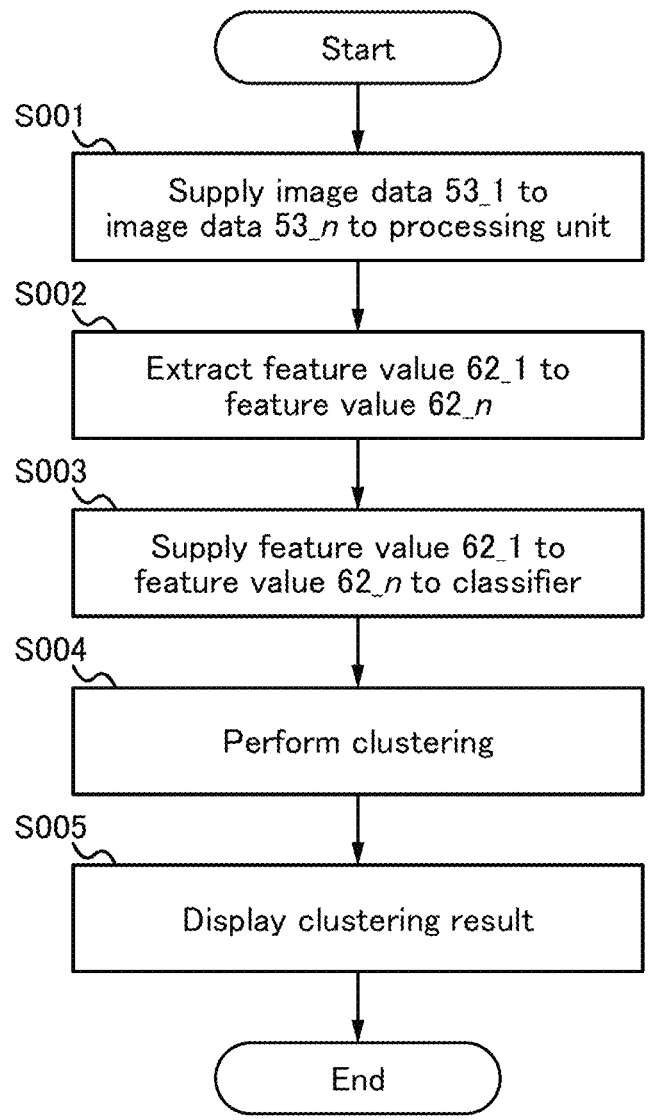
FIG. 5 is a flow chart showing an example of a method for classifying image data.

FIG. 5 is a flow chart showing an example of a method for classifying image data. FIG. 5 is also a flow chart explaining the flow of processing executed by the classification device described in Embodiment 1.

The method for classifying image data includes Step S001 to Step S005 as shown in FIG. 5.

Step S001 is a step of supplying a plurality of pieces of image data to a processing unit. The plurality of pieces of image data correspond to the image data $53\_1$ to the image data $53\_n$ described in Embodiment 1. The processing unit corresponds to the processing unit 102 or the second processing unit 107 described in Embodiment 1.

[Step S002]

Step S002 is a step of extracting a feature value of each of the plurality of pieces of image data in the processing unit. Specifically, a feature value $62\_1$ to a feature value $62\_n$ are extracted from the image data $53\_1$ to the image data $53\_n$, respectively. Extraction of feature values can be performed using the trained discriminative model described in Embodiment 1. In other words, the feature value corresponds to the feature value 305 or the feature value 315 described in Embodiment 1.

The number of dimensions of a feature value of each image data is given as u numerical arrays. Specifically, each of the feature value $62\_1$ to the feature value $62\_n$ is given as u numerical arrays. For example, as shown in FIG. 6, the feature value $62\_1$ extracted from the image data $53\_1$ is composed of a value $63\_1[1]$ to a value $63\_1[u]$. Similarly, the feature value $62\_2$ extracted from the image data $53\_2$ is composed of a value $63\_2[1]$ to a value $63\_2[u]$. Furthermore, similarly, the feature value $62\_n$ extracted from the image data $53\_n$ is composed of a value $63\_n[1]$ to a value $63\_n[u]$.

[Step S003]

Step S003 is a step of supplying the feature values (the feature value $62\_1$ to the feature value $62\_n$) extracted in the processing unit to a classifier. The classifier corresponds to the classifier 103 described in Embodiment 1.

[Step S004]

Step S004 is a step of performing clustering of the plurality of pieces of image data (the image data $53\_1$ to the image data $53\_n$) in the classifier on the basis of the feature values (the feature value $62\_1$ to the feature value $62\_n$). For example, the hierarchical method described in Embodiment 1 can be used for clustering of the image data.

[Step S005]

Step S005 is a step of displaying in the output unit a result of clustering performed in the classifier. The output unit corresponds to the output unit 104 described in Embodiment 1. Note that in the case where a hierarchical method is used for clustering of image data, a dendrogram is created, for example. Thus, the output unit displays a dendrogram, for example.

Through the above steps, the image data can be classified.

Note that the method for classifying image data is not limited to the method described above. Another example of a method for classifying image data is given below.

Figure 7:
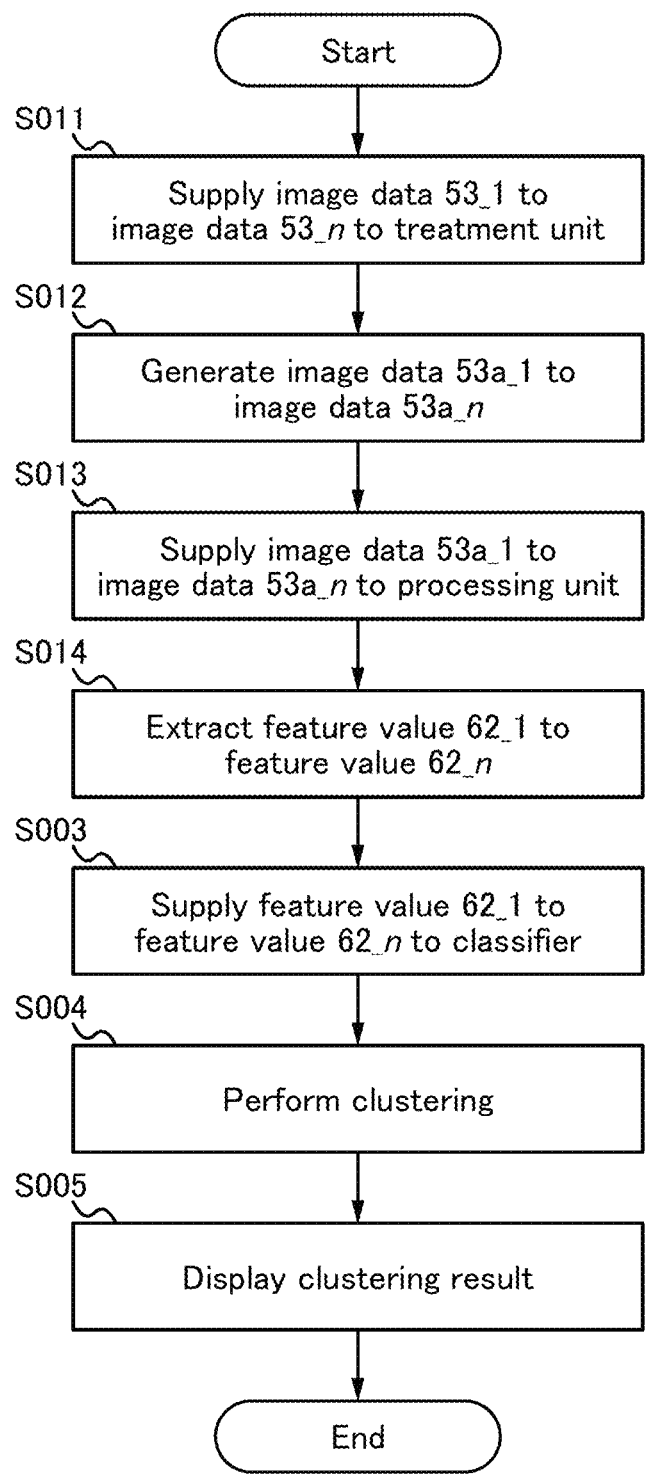
FIG. 7 is a flow chart showing an example of a method for classifying image data.

FIG. 7 is a flow chart showing another example of a method for classifying image data. As shown in FIG. 7, the method for classifying image data may include Step S011 to Step S014 and Step S003 to Step S005. The above description can be referred to for Step S003 to Step S005.

[Step S011]

Step S011 is a step of supplying a plurality of pieces of image data to a treatment unit. The plurality of pieces of image data correspond to the image data $53\_1$ to the image data $53\_n$ described in Embodiment 1. The treatment unit corresponds to the treatment unit 105 described in Embodiment 1.

[Step S012]

Step S012 is a step of processing each of the plurality of pieces of image data in the treatment unit. Specifically, Step S012 is a step of generating the image data $53a\_1$ to the image data $53a\_n$ by processing the image data $53\_1$ to the image data $53\_n$. More specifically, Step S012 is a step of generating the image data $53a\_1$ to the image data $53a\_n$ by cutting out regions containing defects from the image data $53\_1$ to the image data $53\_n$. Note that cutting out of a region containing a defect from image data can be referred to as removal of at least part of a region not containing a defect from image data.

A step of processing the image data $53\_1$ to generate the image data $53a\_1$ will be described below.

The image data $53a\_1$ is preferably a rectangle. The length of a long side of the rectangle is a1 and the length of a short side thereof is a2. The length a1 and the length a2 are specified such that the image data $53a\_1$ fits into the image data $53\_1$. Accordingly, the length a1 is at least less than or equal to the length of a long side of the image data $53\_1$, and the length a2 is at least less than or equal to the length of a short side of the image data $53\_1$. In addition, the length a1 and the length a2 are specified such that a defect fits into the image data $53a\_1$.

The ratio between the length a1 and the length a2 is preferably equal to the ratio between the length of the long side of the image data $53\_1$ and the length of the short side of the image data $53\_1$. In the case where the ratio between the length of the long side of the image data $53\_1$ and the length of the short side of the image data $53\_1$ is 4:3, the length a1 is preferably 640 pixels and the length a2 is preferably 480 pixels, for example.

Note that the ratio between the length a1 and the length a2 is not necessarily equal to the ratio between the length of the long side of the image data $53\_1$ and the length of the short side of the image data $53\_1$. For example, the ratio between the length a1 and the length a2 of the rectangle may be different from the ratio between the length of the long side of the image data 53_1 and the length of the short side of the image data 53_1. Alternatively, the image data 53a_1 may be a square.

Alternatively, the long side of the rectangle may be parallel to the short side of the image data 53_1, and the short side of the rectangle may be parallel to the long side of the image data 53_1. Alternatively, the long side of the rectangle does not need to be parallel or perpendicular to the long side of the image data 53_1.

The position of the image data 53a_1 is determined such that the image data 53a_1 fits into the image data 53_1. Note that the position of the image data 53a_1 may be determined with reference to the center of gravity of the image data 53a_1 or may be determined with reference to one vertex of the image data 53a_1. For example, the center of gravity of the image data 53a_1 is determined by a uniform random number. Uniform random numbers are random numbers that follow a continuous uniform distribution where all real numbers have the same probability of appearing within a specified interval or range.

Although the step of determining the position of the image data 53a_1 after specifying the length a1 and the length a2 is described above, the step is not limited thereto. After the position of the image data 53a_1 is specified, the length a1 and the length a2 may be determined such that the image data 53a_1 fits into the image data 53_1. Alternatively, the position of the image data 53a_1 and the lengths a1 and a2 may be determined at the same time such that the image data 53a_1 fits into the image data 53_1.

The lengths of the long side and the short side of the image data 53a_1 are preferably equal to the lengths of the long side and the short side of another image data 53a_1, respectively. This can improve the accuracy of defect identification as described above.

The above is the description of the step of processing the image data 53_1 to generate the image data 53a_1. Note that the image data 53a_2 to the image data 53a_n can be generated by a similar step.

Step S012 may be performed either by a user or using a classification device automatically. In the case where a classification device is used, for example, a difference between image data containing a defect and image data not containing a defect is preferably obtained and a region with a large difference and the surrounding region are preferably cut out.

Through the above steps, the image data 53a_1 to the image data 53a_n can be generated. By cutting out a region containing a defect from each of the image data 53_1 to the image data 53_n, the proportion of region (area) occupied by a portion to be identified in the entire region (area) of the image data can be increased. Thus, more features of defects contained in the image data can be included in the feature value extracted in the processing unit. Consequently, the accuracy of clustering can be improved. Note that labels assigned to the image data 53_1 to the image data 53_n are assigned to the image data 53a_1 to the image data 53a_n, respectively.

[Step S013]

Step S013 is a step of supplying the image data 53a_1 to the image data 53a_n to the processing unit. The processing unit corresponds to the processing unit 102 or the second processing unit 107 described in Embodiment 1.

[Step S014]

Step S014 is a step of extracting a feature value of each of the image data 53a_1 to the image data 53a_n in the processing unit. Specifically, the feature value 62_1 to the feature value 62_n are extracted from the image data 53a_1 to the image data 53a_n, respectively. Since the image data 53a_1 to the image data 53a_n are generated by processing the image data 53_1 to the image data 53_n, respectively, the feature value 62_1 to the feature value 62_n can be referred to feature values of the image data 53_1 to the image data 53_n, respectively. Extraction of a feature value can be performed using the trained discriminative model described in Embodiment 1.

Step S003, Step S004, and Step S005 are sequentially performed after Step S014. Through the above steps, image data can be classified.

The above is the description of the method for classifying image data. By performing clustering of image data containing defects, the time required for a user to identify defects can be shortened. Even a user who is not sufficiently proficient with defect identification can perform defect identification with high accuracy. In addition, a user can determine quickly and appropriately whether or not a rework process is performed. Furthermore, a defect that has not previously been identified or a defect whose type cannot be identified can be easily identified.

<Method For Generating Trained Discriminative Model>

Here, a method for generating a trained discriminative model of one embodiment of the present invention is described. Note that the method for generating a trained discriminative model can be rephrased as a method for training a discriminative model. Furthermore, the method for generating a trained discriminative model can be rephrased as a method for retraining a trained discriminative model.

Figure 8:
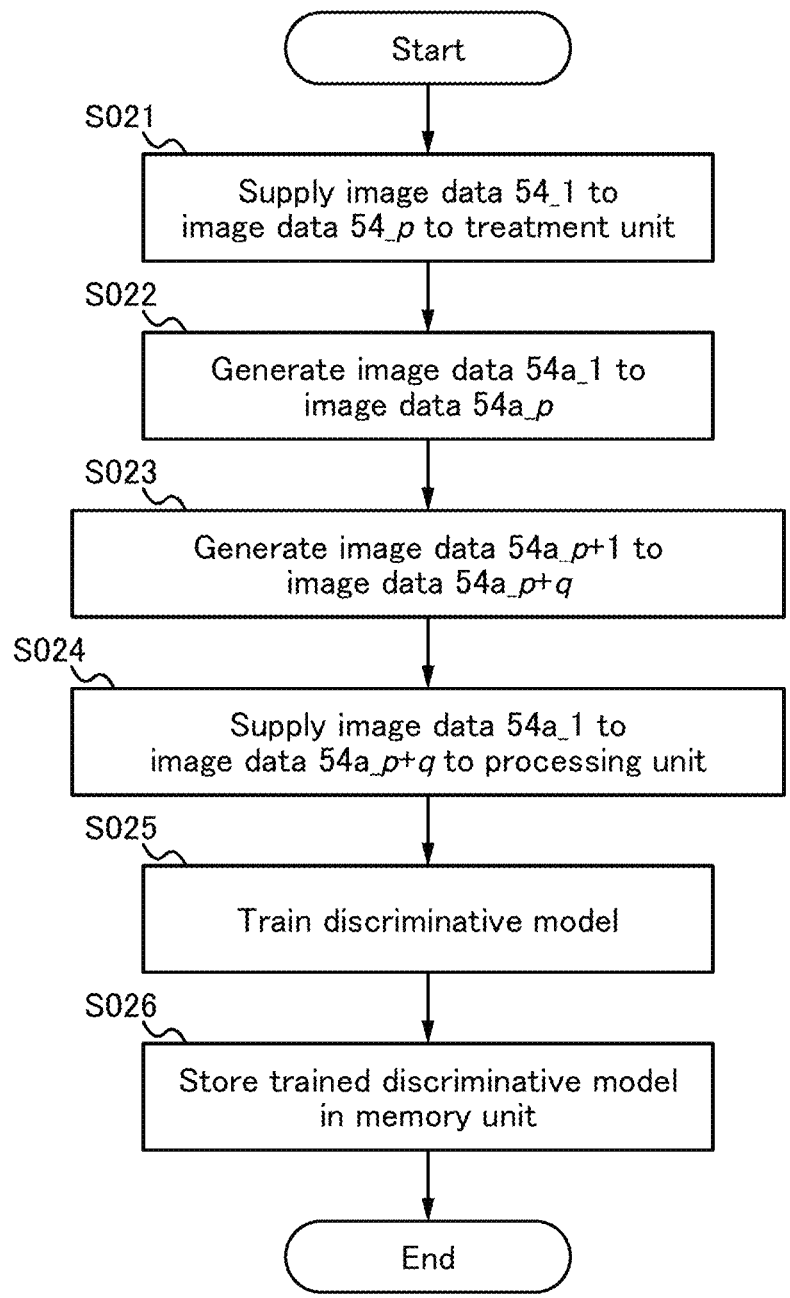
FIG. 8 is a flow chart showing an example of a method for generating a trained discriminative model.

FIG. 8 is a flow chart showing an example of a method for generating a trained discriminative model. FIG. 8 is also a flow chart explaining the flow of processing executed by the classification device described in Embodiment 1.

As shown in FIG. 8, the method for generating a trained discriminative model includes Step S021 to Step S026.

[Step S021]

Step S021 is a step of supplying a plurality of pieces of image data to a treatment unit. The plurality of pieces of image data are image data that can be used as learning data, verification data, or test data. The treatment unit corresponds to the treatment unit 105 described in Embodiment 1.

Each of the plurality of pieces of image data is image data containing a defect. Furthermore, a label corresponding to the defect contained in the image data is assigned to the image data containing the defect. In other words, the plurality of pieces of image data are part or all of the image data 51_1 to the image data 51-s. Here, the plurality of pieces of image data are referred to as image data 54_1 to image data 54_p (p is an integer greater than or equal to 2 and less than or equal to s).

[Step S022]

Step S022 is a step of generating a plurality of image data different from the plurality of pieces of image data by processing the plurality of pieces of image data in the treatment unit. Specifically, Step S022 is a step of generating image data 54a_1 to image data 54a_p by processing the image data 54_1 to the image data 54_p. More specifically, Step S022 is a step of generating the image data 54a_1 to the image data 54a_p by cutting out regions containing defects from the image data 54_1 to the image data 54_p. The description of Step S012 can be referred to for this step.

The proportion of region (area) occupied by a portion to be identified in the region (area) of the entire image data is preferably large. In the case of, for example, an image of a pattern inspection result, it is effective to cut out a defective portion. The above processing enables more features of defects contained in the image data to be included in the feature value extracted in the processing unit. Consequently, the accuracy of clustering can be improved. Note that labels assigned to the image data 54_1 to the image data 54_$p$ are assigned to the image data 54$a$_1 to the image data 54$a$_$p$, respectively.

[Step S023]

Step S023 is a step of performing data augmentation in the treatment unit. Examples of a data augmentation method include rotation, inversion, noise addition, blur processing, and gamma conversion performed on image data. To perform data augmentation, part or all of the image data 54$a$_1 to the image data 54$a$_$p$ are preferably used. Data augmentation generates q (q is an integer greater than or equal to 1) pieces of image data (image data 54$a$_$p$+1 to image data 54$a$_$p$+$q$).

It is preferable that a substantially equal number of pieces of image data be generated for each defect. For example, the number of pieces of image data to which a label corresponding to foreign matter is assigned, the number of pieces of image data to which a label corresponding to film loss is assigned, and the number of pieces of image data to which a label corresponding to a defective pattern is assigned are preferably substantially equal. This can suppress overfitting (overtraining) for a specific defect.

A data augmentation method, the number of pieces of image data generated by data augmentation, or the like may be selected randomly or specified by a user. Alternatively, it may be selected automatically by a classification device on the basis of the labels assigned to the image data 54$a$_1 to the image data 54$a$_$p$, for example.

Note that the data augmentation is not necessarily performed, for example, in the case where learning data sufficient to generate a discriminative model capable of highly accurate identification can be prepared. In that case, Step S023 may be omitted.

By performing Step S022 and Step S023, a learning data set can be generated. Input data of a learning data set are p pieces of image data (the image data 54$a$_1 to the image data 54$a$_$p$) generated in Step S022 and q pieces of image data (the image data 54$a$_$p$+1 to the image data 54$a$_$p$+$q$) generated in Step S023.

A correct label of the learning data set is a label assigned to each of the image data 54$a$_1 to the image data 54$a$_$p$+$q$.

In this manner, the learning data set is composed of (p+q) pieces of image data and labels assigned to the image data.

[Step S024]

Step S024 is a step of supplying the learning data set generated in the treatment unit to a processing unit. The learning data set includes the image data 54$a$_1 to the image data 54$a$_$p$+$q$. The processing unit corresponds to the first processing unit 106 described in Embodiment 1.

[Step S025]

Step S025 is a step of training a discriminative model using the learning data set in the processing unit.

In learning of the discriminative model, the learning data set is preferably divided into learning data, verification data, and test data. For example, the discriminative model learns using the learning data, learning results are evaluated using the verification data, and the trained discriminative model is evaluated using the test data. This allows the accuracy of the trained discriminative model to be verified. Hereinafter, the ratio of the number of correct identification results to the number of pieces of test data might be referred to as an accuracy rate.

Note that the learning data is composed of some of the image data 54$a$_1 to the image data 54$a$_$p$+$q$. The verification data is composed of some of the image data that are not used for the learning data. The test data is composed of the image data that are not used for the learning data and the verification data.

Examples of a method for dividing a learning data set into learning data, verification data, and test data include Hold-out, Cross Validation, and Leave One Out.

The learning may be terminated at the time when a predetermined number of times is reached. Alternatively, the learning may be terminated at the time when the accuracy rate exceeds a predetermined threshold value. Further alternatively, the learning may be terminated at the time when the accuracy rate is saturated to some extent. Note that a constant is preferably prepared in advance for the number of times of learning or the threshold value. Alternatively, a user may specify the timing when the learning is terminated during the learning.

The above-described learning generates a trained discriminative model.

[Step S026]

Step S026 is a step of storing the trained discriminative model generated in Step S025 in a memory unit. The memory unit is the memory unit 101 described in Embodiment 1. Note that the memory unit may be stored in a memory unit included in the first processing unit 106, a memory unit included in the processing unit 102 or the second processing unit 107, a storage medium connected to the classification device, or the like.

The above has described the example of the method for generating a trained discriminative model. A discriminative model learns on the basis of the learning data set, whereby a discriminative model with high accuracy of defect identification can be generated.

According to one embodiment of the present invention, a method for classifying image data can be provided.

This embodiment can be combined with any of the other embodiments, Example, and the like as appropriate. In the case where a plurality of structure examples are described in one embodiment in this specification, the structure examples can be combined as appropriate.

Embodiment 3

In this embodiment, a classification device of one embodiment of the present invention will be described with reference to FIG. 9 and FIG. 10.

<Structure Example 1 of Classification Device>

Figure 9:
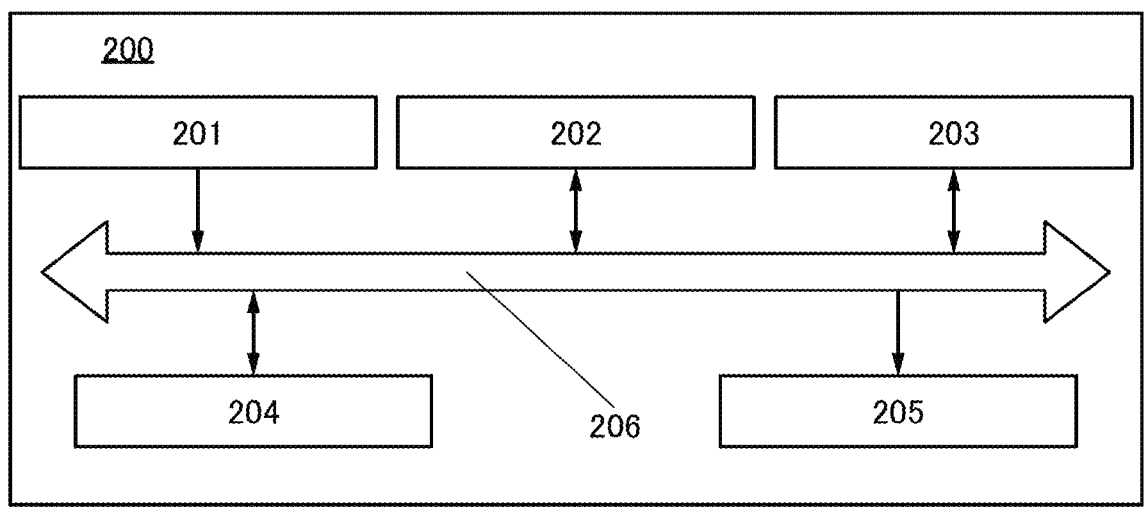
FIG. 9 is a diagram showing an example of hardware of a classification device.

FIG. 9 is a block diagram of a classification device 200. Note that in a block diagram attached to this specification, components are classified according to their functions and shown as independent blocks; however, it is practically difficult to completely separate the components according to their functions, and one component may have a plurality of functions. Moreover, one function can relate to a plurality of components; for example, processing performed by a processing unit 202 can be executed on different servers depending on the processing.

The classification device 200 shown in FIG. 9 includes an input unit 201, the processing unit 202, a memory unit 203, a database 204, a display unit 205, and a transmission path 206.

[Input Unit 201]

To the input unit 201, image data is supplied from the outside of the classification device 200. The image data corresponds to the labeled image data and the unlabeled image data described in the above embodiment. The image data supplied to the input unit 201 is supplied to the processing unit 202, the memory unit 203, or the database 204 via the transmission path 206.

[Processing Unit 202]

The processing unit 202 has a function of performing processing using the data supplied from the input unit 201, the memory unit 203, the database 204, or the like. The processing unit 202 can supply a processing result to the memory unit 203, the database 204, the display unit 205, or the like.

The processing unit 202 includes the processing unit 102 or the second processing unit 107 and the classifier 103 described in the above embodiment. In other words, the processing unit 202 has a function of performing processing using a trained discriminative model and a function of performing clustering, for example. The processing unit 202 may include the treatment unit 105 and the first processing unit 106 described in the above embodiment. In that case, the processing unit 202 has a function of processing image data, a function of performing data augmentation, a function of generating a learning data set, a function of training an identification model, or the like.

A transistor including a metal oxide in its channel formation region may be used in the processing unit 202. The transistor has an extremely low off-state current; therefore, with the use of the transistor as a switch for retaining electric charge (data) that has flowed into a capacitor serving as a memory element, a long data retention period can be ensured. When at least one of a register and a cache memory included in the processing unit 202 has such a feature, the processing unit 202 can be operated only when needed, and otherwise can be off while data processed immediately before turning off the processing unit 202 is stored in the memory element. In other words, normally-off computing is possible and the power consumption of the classification device can be reduced.

In this specification and the like, a transistor including an oxide semiconductor in its channel formation region is referred to as an oxide semiconductor transistor (OS transistor). A channel formation region of an OS transistor preferably includes a metal oxide.

The metal oxide included in the channel formation region preferably contains indium (In). When the metal oxide included in the channel formation region is a metal oxide containing indium, the carrier mobility (electron mobility) of the OS transistor increases. The metal oxide included in the channel formation region preferably contains an element M The element M is preferably aluminum (Al), gallium (Ga), or tin (Sn). Other elements that can be used as the element M are boron (B), titanium (Ti), iron (Fe), nickel (Ni), germanium (Ge), yttrium (Y), zirconium (Zr), molybdenum (Mo), lanthanum (La), cerium (Ce), neodymium (Nd), hafnium (Hf), tantalum (Ta), tungsten (W), and the like. Note that two or more of the above elements may be used in combination as the element M. The element M is an element having high bonding energy with oxygen, for example. The element M is an element whose bonding energy with oxygen is higher than that of indium, for example. The metal oxide included in the channel formation region preferably contains zinc (Zn). The metal oxide containing zinc is easily crystallized in some cases.

The metal oxide included in the channel formation region is not limited to the metal oxide containing indium. The metal oxide included in the channel formation region may be a metal oxide that does not contain indium and contains zinc, a metal oxide that contains gallium, or a metal oxide that contains tin, e.g., zinc tin oxide or gallium tin oxide.

A transistor including silicon in its channel formation region (Si transistor) may be used in the processing unit 202. A transistor including a semiconductor material having a bandgap such as graphene, silicene, and chalcogenide (transition metal chalcogenide) may also be used in a channel formation region.

In the processing unit 202, a transistor containing an oxide semiconductor in a channel formation region and a transistor containing silicon in a channel formation region may be used in combination.

The processing unit 202 includes, for example, an arithmetic circuit, a central processing unit (CPU), or the like.

The processing unit 202 may include a microprocessor such as a DSP (Digital Signal Processor) or a GPU (Graphics Processing Unit). The microprocessor may be constructed with a PLD (Programmable Logic Device) such as an FPGA (Field Programmable Gate Array) or an FPAA (Field Programmable Analog Array). The processing unit 202 can interpret and execute instructions from various programs with the use of a processor to process various types of data and control programs. The programs to be executed by the processor are stored in at least one of a memory region of the processor and the memory unit 203.

The processing unit 202 may include a main memory. The main memory includes at least one of a volatile memory such as a RAM and a nonvolatile memory such as a ROM.

A DRAM (Dynamic Random Access Memory), an SRAM (Static Random Access Memory), or the like is used as the RAM, for example, and a virtual memory space is assigned as a work space for the processing unit 202 to be used. An operating system, an application program, a program module, program data, a look-up table, and the like that are stored in the memory unit 203 are loaded into the RAM for execution. The data, program, and program module that are loaded into the RAM are each directly accessed and operated by the processing unit 202.

In the ROM, a BIOS (Basic Input/Output System), firmware, and the like for which rewriting is not needed can be stored. Examples of the ROM include a mask ROM, an OTPROM (One Time Programmable Read Only Memory), and an EPROM (Erasable Programmable Read Only Memory). Examples of the EPROM include a UV-EPROM (Ultra-Violet Erasable Programmable Read Only Memory) which can erase stored data by ultraviolet irradiation, an EEPROM (Electrically Erasable Programmable Read Only Memory), and a flash memory.

Note that a product-sum operation is performed in a neural network. When the product-sum operation is performed by hardware, the processing unit 202 preferably includes a product-sum operation circuit. A digital circuit may be used or an analog circuit may be used as the product-sum operation circuit. In the case where an analog circuit is used as the product-sum operation circuit, the circuit scale of the product-sum operation circuit can be reduced, or higher processing speed and lower power consumption can be achieved by reduced frequency of access to a memory. Note that the product-sum operation may be performed on software using a program.

The product-sum operation circuit may be configured with a Si transistor or an OS transistor. An OS transistor is particularly suitable for a transistor included in an analog memory of the product-sum operation circuit because of its extremely low off-state current. Note that the product-sum operation circuit may be configured with both a Si transistor and an OS transistor.

[Memory Unit 203]

The memory unit 203 has a function of storing a program to be executed by the processing unit 202. The memory unit 203 has a function of storing, for example, a discriminative model and a program on a clustering method. The memory unit 203 may have a function of storing image data supplied to the input unit 201, for example.

The memory unit 203 includes at least one of a volatile memory and a nonvolatile memory. For example, the memory unit 203 may include a volatile memory such as a DRAM or an SRAM. For example, the memory unit 203 may include a nonvolatile memory such as an ReRAM (Resistive Random Access Memory), a PRAM (Phase change Random Access Memory), an FeRAM (Ferroelectric Random Access Memory), an MRAM (Magnetoresistive Random Access Memory), or a flash memory. The memory unit 203 may include storage media drives such as a hard disk drive (HDD) and a solid state drive (SSD).

[Database 204]

The classification device 200 may include the database 204. For example, the database 204 has a function of storing the above image data. Note that image data related to a learning data set, a trained discriminative model, a clustering result, or the like generated in the processing unit 202 may be stored.

Note that the memory unit 203 and the database 204 are not necessarily separated from each other. For example, the classification device 200 may include a storage unit that has both the function of the memory unit 203 and that of the database 204.

Note that memories included in the processing unit 202, the memory unit 203, and the database 204 can each be regarded as an example of a non-transitory computer readable storage medium.

[Display Unit 205]

The display unit 205 has a function of displaying a processing result obtained in the processing unit 202. For example, the display unit 205 has a function of displaying a clustering result.

The classification device 200 may include an output unit. The output unit has a function of supplying data to the outside.

[Transmission Path 206]

The transmission path 206 has a function of transmitting various pieces of data. Data transmission and reception among the input unit 201, the processing unit 202, the memory unit 203, the database 204, and the display unit 205 can be carried out via the transmission path 206. For example, data such as image data or a trained discriminative model is transmitted and received via the transmission path 206.

<Structure Example 2 of Classification Device>

Figure 10:
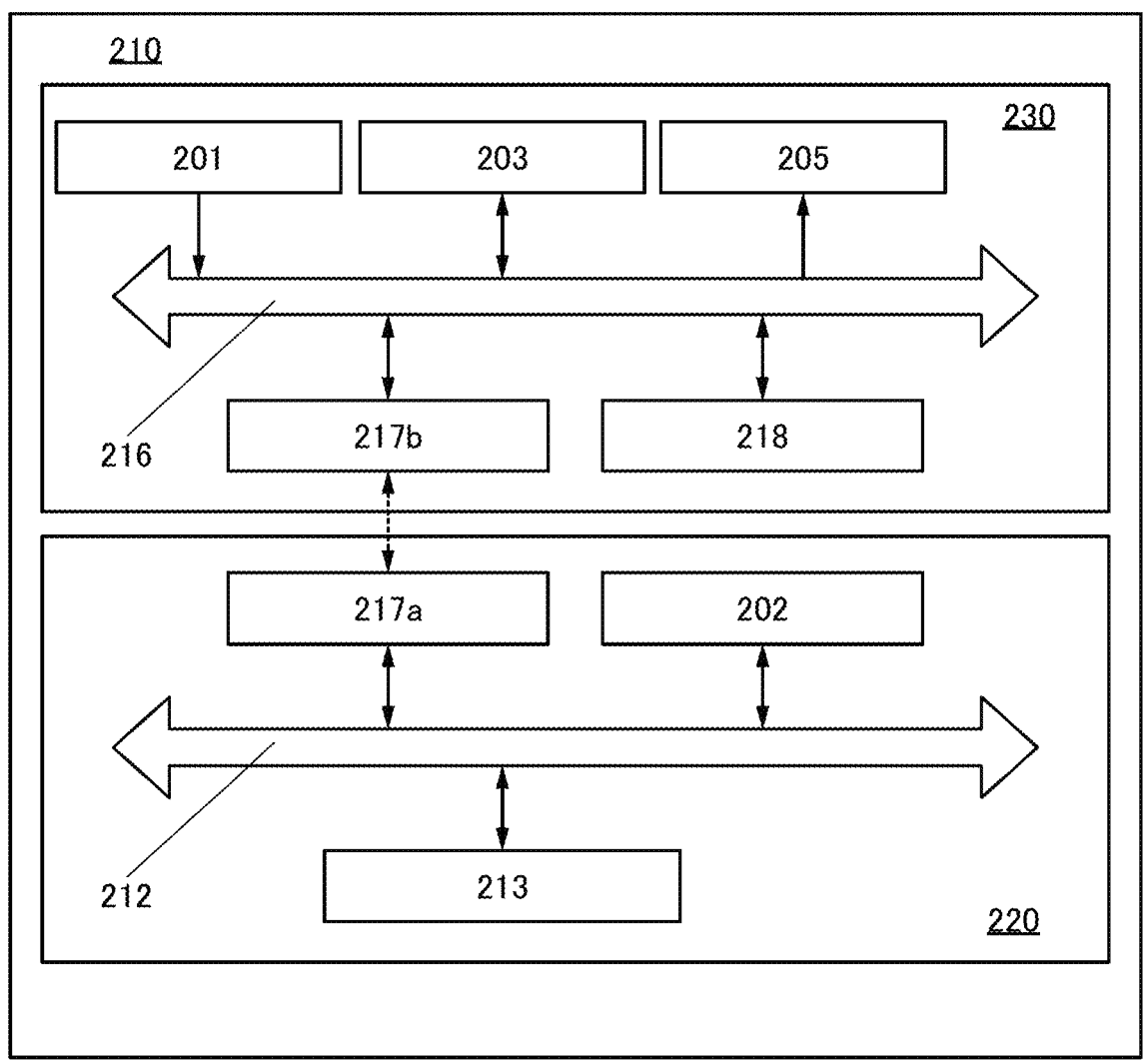
FIG. 10 is a diagram showing an example of hardware of a classification device.

FIG. 10 is a block diagram of a classification device 210. The classification device 210 includes a server 220 and a terminal 230 (e.g., a personal computer).

The server 220 includes the processing unit 202, a transmission path 212, a memory unit 213, and a communication unit 217a. Although not shown in FIG. 10, the server 220 may further include an input unit, an output unit, or the like.

The terminal 230 includes the input unit 201, the memory unit 203, the display unit 205, a transmission path 216, a communication unit 217b, and a processing unit 218. Although not shown in FIG. 10, the terminal 230 may further include a database or the like.

Image data, a discriminative model, or the like received by the communication unit 217a is stored in the memory unit 213 via the transmission path 212. Alternatively, the image data, the discriminative model, or the like may be directly supplied to the processing unit 202 from the communication unit 217a.

The learning of the discriminative model, which has been described in the above embodiment, requires high processing capability. The processing unit 202 included in the server 220 has higher processing capability than the processing unit 218 included in the terminal 230. Thus, learning of a discriminative model is preferably performed in the processing unit 202.

Then, a trained discriminative model is generated by the processing unit 202. The trained discriminative model is supplied from the processing unit 202 to the communication unit 217a directly or via the transmission path 212. The trained discriminative model is transmitted from the communication unit 217a of the server 220 to the communication unit 217b of the terminal 230 and is stored in the memory unit 203. Alternatively, the trained discriminative model may be stored in the memory unit 213 via the transmission path 212.

[Transmission Path 212 and Transmission Path 216]

The transmission path 212 and the transmission path 216 have a function of transmitting data. Data transmission and reception among the processing unit 202, the memory unit 213, and the communication unit 217a can be carried out via the transmission path 212. Data transmission and reception among the input unit 201, the memory unit 203, the display unit 205, the communication unit 217b, and the processing unit 218 can be carried out via the transmission path 216.

[Processing Unit 202 and Processing Unit 218]

The processing unit 202 has a function of performing processing using the data supplied from the memory unit 213, the communication unit 217a, or the like. The processing unit 218 has a function of performing processing using the data supplied from the input unit 201, the memory unit 203, the display unit 205, the communication unit 217b, or the like. The description of the processing unit 202 can be referred to for the processing unit 202 and the processing unit 218. The processing unit 202 preferably has higher processing capability than the processing unit 218.

[Memory Unit 203]

The memory unit 203 has a function of storing a program to be executed by the processing unit 218. In addition, the memory unit 203 has a function of storing a trained discriminative model generated by the processing unit 202, a clustering result generated by the processing unit 218, data input to the communication unit 217b, data input to the input unit 201, or the like.

[Memory Unit 213]

The memory unit 213 has a function of storing a program to be executed by the processing unit 202. In addition, the memory unit 213 has a function of storing a discriminative model, data input to the communication unit 217a, or the like. The description of the memory unit 203 can be referred to for the memory unit 213.

[Communication Unit 217a and Communication Unit 217b]

Dara transmission and reception between the server 220 and the terminal 230 can be carried out with the use of the communication unit 217a and the communication unit 217b. As the communication unit 217a and the communication unit 217b, a hub, a router, a modem, or the like can be used. Data may be transmitted or received through wire communication or wireless communication (e.g., radio waves or infrared rays).

Note that communication between the server 220 and the terminal 230 may be performed by connection with a computer network such as the Internet, which is an infrastructure of the World Wide Web (WWW), an intranet, an extranet, a PAN (Personal Area Network), a LAN (Local Area Network), a CAN (Campus Area Network), a MAN (Metropolitan Area Network), a WAN (Wide Area Network), or a GAN (Global Area Network).

This embodiment can be combined with any of the other embodiments, Example, and the like as appropriate.

Embodiment 4

In this embodiment, a pattern inspection device of one embodiment of the present invention will be described with reference to FIG. 11. The pattern inspection device of one embodiment of the present invention includes the classification device described in the above embodiment.

Figure 11:
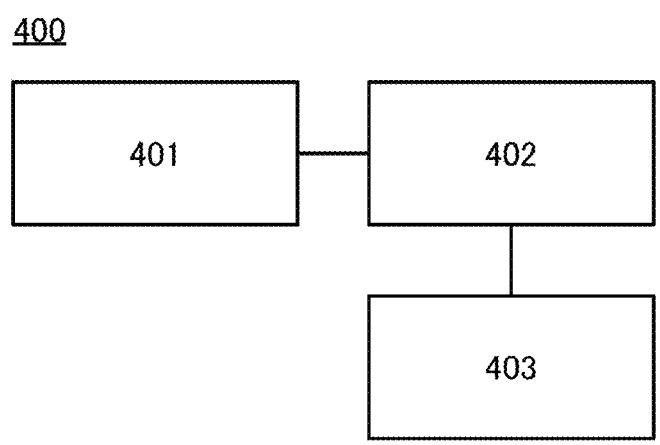
FIG. 11 is a block diagram showing an example of a pattern inspection device.

FIG. 11 shows a structure of a pattern inspection device 400. As shown in FIG. 11, the pattern inspection device 400 includes an imaging device 401, an inspection device 402, and a classification device 403. The classification device 403 corresponds to the classification device 100 described in the above embodiment.

The imaging device 401 has a function of capturing an image of a semiconductor element in the middle of the manufacturing process or a semiconductor element whose manufacturing process has been completed. An example of the imaging device 401 is a camera. An image of the semiconductor element is captured, whereby image data in which the presence or absence of a defect has not been determined is obtained. In other words, the image data is image data to be identified or subjected to clustering.

The inspection device 402 has a function of determining whether or not the image data obtained using the imaging device 401 contains a defect. Accordingly, it is possible to determine whether or not the image data contains a defect.

To determine whether or not a defect is contained, image data to be subjected to the determination and image data obtained in the previous step are compared with each other. Here, a semiconductor element included in the image data to be subjected to the determination is different from a semiconductor element included in the image data obtained in the previous step. For example, first, a difference between the image data to be subjected to the determination and the image data obtained in the previous step is obtained. Then, on the basis of the difference, whether or not a defect is contained may be determined.

Note that machine learning may be used to determine whether or not a defect is contained. The number of pieces of image data subjected to determination of whether or not a defect is contained tends to be enormous. Thus, machine learning can be used to shorten the time required for the determination.

To determine whether or not a defect is contained, a method similar to detection of an abnormal portion can be used, for example. Unsupervised learning is used to detect an abnormal portion in some cases. Thus, unsupervised learning is preferably used for the determination. Unsupervised learning makes it possible to accurately determine whether or not a defect is contained even when the number of pieces of image data containing a defect is small.

Note that supervised learning is used to detect an abnormal portion in some cases. Thus, supervised learning may also be used for the determination. Supervised learning makes it possible to accurately determine whether or not a defect is contained.

For the machine learning, a neural network (especially deep learning) is preferably used.

Image data that has been determined to contain a defect is subjected to identification or clustering. In other words, the image data can be one of the plurality of pieces of image data 50 describe in the above embodiment. The image data is supplied to the classification device 403.

By including the imaging device 401, the inspection device 402, and the classification device 403, the pattern inspection device 400 can obtain image data and determine the presence or absence of a defect in addition to clustering of image data and/or generation of a trained discriminative model.

Note that the inspection device 402 may be provided in a server different from a server in which the classification device 403 is provided. Alternatively, the inspection device 402 may be provided in a server in which the classification device 403 is provided. Further alternatively, a server may be provided with some functions of the inspection device 402 and some functions of the classification device 403 and a server different from the server may be provided with some other functions of the inspection device 402 and some other functions of the classification device 403.

The above is the description of the structure of the pattern inspection device 400. The pattern inspection device of one embodiment of the present invention enables a series of processes from image data acquisition to image data clustering to be performed efficiently. In addition, the pattern inspection device enables the series of processes to be fully automated.

According to one embodiment of the present invention, a novel pattern inspection device can be provided.

This embodiment can be combined with any of the other embodiments, Example, and the like as appropriate.

Example

In this example, clustering of image data containing defects was performed using a trained discriminative model. Results of the image data clustering will be described with reference to FIG. 12 and FIG. 13.

In this example, a CNN was used as a discriminative model. The CNN is composed of seven convolution layers, six pooling layers, and five fully connected layers (fully connected layers 913_1 to 913_5). A neuron provided in the fully connected layer 913_1 is connected to a neuron provided in one pooling layer and a neuron provided in the fully connected layer 913_2. The neuron provided in the fully connected layer 913_2 is connected to the neuron provided in the fully connected layer 913_1 and a neuron provided in the fully connected layer 913_3. The neuron provided in the fully connected layer 913_3 is connected to the neuron provided in the fully connected layer 913_2 and a neuron provided in the fully connected layer 913_4. The neuron provided in the fully connected layer 913_4 is connected to the neuron provided in the fully connected layer 913_3 and a neuron provided in the fully connected layer 913_5. Note that the fully connected layer 913_5 was an output layer. The fully connected layer 913_1 to the fully connected layer 913_4 are included in an intermediate layer. Note that for example, when a neuron provided in a first fully connected layer is connected to a neuron provided in a second fully connected layer, it can be said that the first fully connected layer is connected to the second fully connected layer.

In this example, the numerical value of the neuron included in the fully connected layer 913_2 was a feature value of image data input to an input layer. Note that the number of dimensions of the feature value was 64.

In this example, clustering of 344 pieces of image data containing defects was performed. Specifically, with the use of the discriminative model, a feature value of each of 344 pieces of image data containing defects was obtained and cluster analysis was performed on the basis of the feature values. A hierarchical method was used for the cluster analysis.

Figure 12:
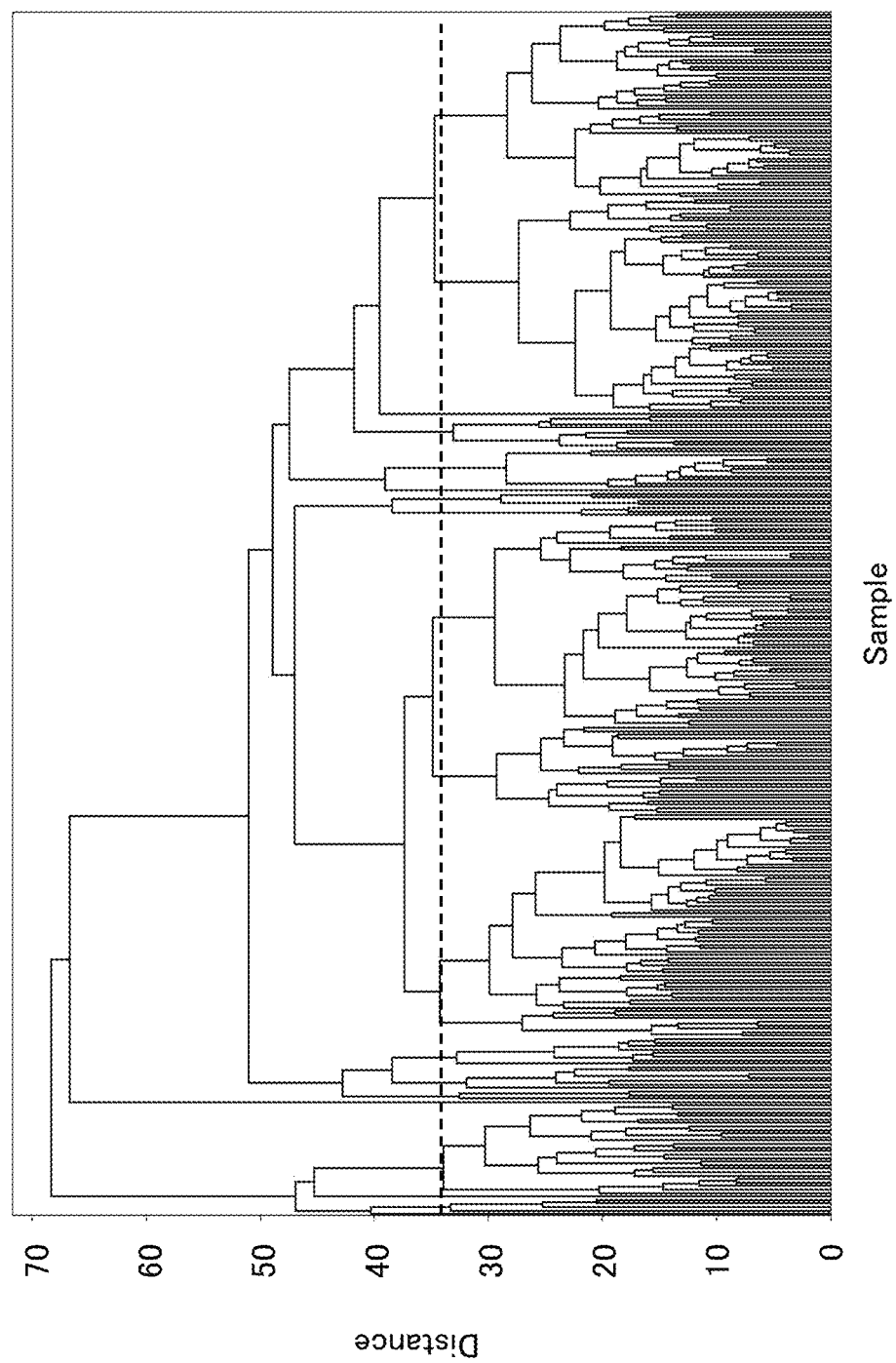
FIG. 12 is a diagram showing results of clustering.
Figure 13A:
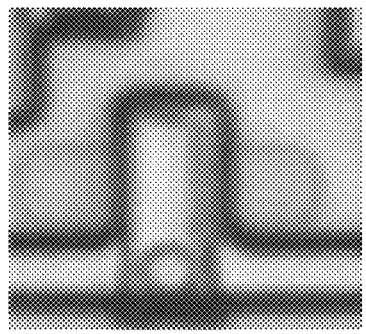
FIG. 13A to FIG. 13D are diagrams showing examples of image data.
Figure 13B:
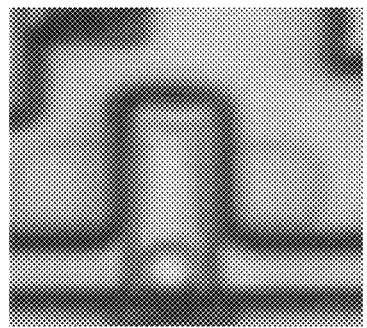
Figure 13C:
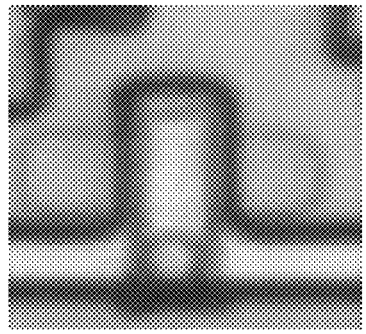
Figure 13D:
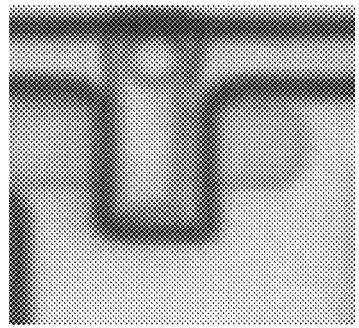

FIG. 12 shows clustering results. FIG. 12 is a dendrogram illustrating clustering results. The vertical axis represents the distance between clusters. Note that on the horizontal axis, image data is arranged as appropriate so that the image data is grouped into clusters.

The threshold value of the distance between clusters was set to 34.1 (dashed line in FIG. 12) in the dendrogram shown in FIG. 12, whereby 20 clusters were obtained. FIG. 13A to FIG. 13D show parts of the image data included in one of the 20 clusters. It is found that the parts of the image data, which are shown in FIG. 13A to FIG. 13D, contain the same type of defective pattern. In other words, the cluster is found to be a cluster related to part of defective pattern.

As described above, the method described in this embodiment enables clustering in which similar defects are grouped into clusters.

This example can be implemented in combination with any of the structures described in the other embodiments and the like as appropriate.

REFERENCE NUMERALS

50: image data, 51_s: image data, 51_1: image data, 51_2: image data, 52_t: image data, 52_1: image data, 53_n: image data, 53_1: image data, 53_2: image data, 53a_n: image data, 53a_1: image data, 53a_2: image data, 54_p: image data, 54_1: image data, 54a_p: image data, 54a_1: image data, 61A: label, 61F: label, 62_n: feature value, 62_1: feature value, 62_2: feature value, 63_n: value, 63_1: value, 63_2: value, 100: classification device, 100A: classification device, 100B: classification device, 101: memory unit, 102: processing unit, 103: classifier, 104: output unit, 105: treatment unit, 106: processing unit, 107: processing unit, 200: classification device, 201: input unit, 202: processing unit, 203: memory unit, 204: database, 205: display unit, 206: transmission path, 210: classification device, 212: transmission path, 213: memory unit, 216: transmission path, 217a: communication unit, 217b: communication unit, 218: processing unit, 220: server, 230: terminal, 300: neural network, 301_k: layer, 301_k-1: layer, 301_k-2: layer, 301_1: layer, 301_2: layer, 301_3: layer, 305: feature value, 310: CNN, 311_m: layer, 311_1: layer, 311_2: layer, 312_m: pooling layer, 312_m-1: pooling layer, 312_1: pooling layer, 313: fully connected layer, 313_1: fully connected layer, 313_2: fully connected layer, 313_3: fully connected layer, 315: feature value, 400: pattern inspection device, 401: imaging device, 402: inspection device, 403: classification device, 913_1: fully connected layer, 913_2: fully connected layer, 913_3: fully connected layer, 913_4: fully connected layer, 913_5: fully connected layer This application is based on Japanese Patent Application Serial No. 2020-073779 filed on Apr. 17, 2020, the entire contents are hereby incorporated herein by reference.

The invention claimed is:

1. A classification device comprising:
a memory unit, a processing unit, and a classifier,
wherein a plurality of pieces of image data and a discriminative model are stored in the memory unit,
wherein the discriminative model comprises a plurality of convolutional layers, a plurality of pooling layers, and a plurality of fully connected layers,
wherein the plurality of fully connected layers comprise a first fully connected layer, a second fully connected layer, a third fully connected layer, a fourth fully connected layer, and a fifth fully connected layer,
wherein first to n-th image data of the plurality of pieces of image data are supplied to the processing unit where n is an integer greater than or equal to 2,
wherein the processing unit is configured to output a k-th feature value of k-th image data on the basis of the discriminative model where k is an integer greater than or equal to 1 and less than or equal to n,
wherein the fifth fully connected layer is an output layer,
wherein the fourth fully connected layer is connected to the fifth fully connected layer,
wherein the third fully connected layer is connected to the fourth fully connected layer,
wherein the second fully connected layer is connected to the third fully connected layer,
wherein the first fully connected layer is connected to the second fully connected layer,
wherein a feature value output from the processing unit is any one of a numerical value of a neuron included in the first fully connected layer, a numerical value of a neuron included in the second fully connected layer, or a numerical value of a neuron included in the third fully connected layer,
wherein a first to an n-th feature value output from the processing unit are supplied to the classifier, and
wherein the classifier is configured to perform clustering of the first to the n-th image data on the basis of the first to the n-th feature value.

2. The classification device according to claim 1, wherein each of the plurality of pieces of image data is image data determined to contain a defect.

3. The classification device according to claim 1, wherein the number of dimensions of the feature value output from the processing unit is greater than or equal to 32 and less than or equal to 256.

4. The classification device according to claim 1,
wherein the discriminative model is subjected to supervised learning so that the type of defect of image data determined to contain a defect is inferred, and
wherein a hierarchical method is used for the clustering.

5. The classification device according to claim 1, further comprising:
an output unit in addition to the memory unit, the processing unit, and the classifier,
wherein the output unit is configured to display a result of the clustering performed by the classifier.

6. A pattern inspection device comprising:
the classification device according to claim 1, an imaging unit, and an inspection device,
wherein the imaging unit is configured to capture an image of an object to be inspected, and
wherein the inspection device is configured to determine whether or not a defect is contained in image data obtained through the capturing by the imaging unit.

7. A classification device comprising:

a memory unit, a processing unit, and a classifier, wherein a plurality of pieces of image data and a discriminative model are stored in the memory unit, wherein each of the plurality of pieces of image data is image data determined to contain a defect, wherein the discriminative model comprises an input layer, an intermediate layer, and an output layer, wherein first to n-th image data of the plurality of pieces of image data are supplied to the processing unit, wherein n is an integer greater than or equal to 2, wherein the processing unit is configured to output a k-th feature value of k-th image data on the basis of the discriminative model, wherein k is an integer greater than or equal to 1 and less than or equal to n, wherein a feature value output from the processing unit is a numerical value of a neuron included in the intermediate layer, wherein a first to an n-th feature value output from the processing unit are supplied to the classifier, and wherein the classifier is configured to perform clustering of the first to the n-th image data on the basis of the first to the n-th feature value.

8. The classification device according to claim 7, wherein the number of dimensions of the feature value output from the processing unit is greater than or equal to 32 and less than or equal to 256.

9. The classification device according to claim 7, wherein the discriminative model is subjected to supervised learning so that the type of defect of image data determined to contain a defect is inferred, and wherein a hierarchical method is used for the clustering.

10. The classification device according to claim 7, further comprising:

an output unit in addition to the memory unit, the processing unit, and the classifier, wherein the output unit is configured to display a result of clustering performed by the classifier.

11. A pattern inspection device comprising:

the classification device according to claim 7, an imaging unit, and an inspection device, wherein the imaging unit is configured to capture an image of an object to be inspected, and wherein the inspection device is configured to determine whether or not a defect is contained in image data obtained through the capturing by the imaging unit.

12. An image classification method comprising:

a first step of supplying first to n-th image data to a processing unit;

a second step of extracting a first to an n-th feature value of the first to the n-th image data using the processing unit on the basis of a discriminative model, a third step of supplying the first to the n-th feature value to a classifier, and a fourth step of performing clustering of the first to the n-th image data using the classifier on the basis of the first to the n-th feature value, wherein n is an integer greater than or equal to 2, wherein each of the first to the n-th image data is image data determined to contain a defect, wherein the discriminative model comprises an input layer, an intermediate layer, and an output layer, and wherein a feature value output from the processing unit is a numerical value of a neuron included in the intermediate layer.

13. The image classification method according to claim 12, wherein the number of dimensions of a feature value output from the processing unit is greater than or equal to 32 and less than or equal to 256.

14. The image classification method according to claim 12, wherein the discriminative model is subjected to supervised learning so that the type of defect of image data determined to contain a defect is inferred, and wherein a hierarchical method is used for the clustering.

15. The image classification method according to claim 12, further comprising:

a fifth step of supplying a result of the clustering performed by the classifier to an output unit; and a sixth step of displaying the result.

* * * * *